US010271355B2

United States Patent
Liu et al.

(10) Patent No.: US 10,271,355 B2
(45) Date of Patent: Apr. 23, 2019

(54) NON-CONTENTION RANDOM ACCESS METHOD, NODE, SYSTEM, AND COMPUTER STORAGE MEDIUM

(71) Applicant: ZTE Corporation, Shenzhen, Guangdong (CN)

(72) Inventors: Kun Liu, Shenzhen (CN); Bo Dai, Shenzhen (CN); Zhaohua Lu, Shenzhen (CN); Shuqiang Xia, Shenzhen (CN); Huiying Fang, Shenzhen (CN); Jing Shi, Shenzhen (CN); Xincai Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 79 days.

(21) Appl. No.: 15/110,255

(22) PCT Filed: Aug. 6, 2014

(86) PCT No.: PCT/CN2014/083821
§ 371 (c)(1),
(2) Date: Jul. 7, 2016

(87) PCT Pub. No.: WO2015/103874
PCT Pub. Date: Jul. 16, 2015

(65) Prior Publication Data
US 2016/0330766 A1 Nov. 10, 2016

(30) Foreign Application Priority Data

Jan. 9, 2014 (CN) .......................... 2014 1 0010610

(51) Int. Cl.
*H04W 74/08* (2009.01)
*H04W 28/18* (2009.01)
*H04W 72/04* (2009.01)

(52) U.S. Cl.
CPC ....... *H04W 74/0833* (2013.01); *H04W 28/18* (2013.01); *H04W 72/042* (2013.01); *H04W 72/0446* (2013.01)

(58) Field of Classification Search
CPC ............. H04W 74/0833; H04W 28/18; H04W 72/042; H04W 72/0446
See application file for complete search history.

(56) References Cited

U.S. PATENT DOCUMENTS

| 2013/0083749 A1 | 4/2013 | Xu |
| 2015/0016312 A1* | 1/2015 | Li .................... H04W 74/0833 370/280 |

(Continued)

FOREIGN PATENT DOCUMENTS

| CN | 102185685 A | 9/2011 |
| CN | 102484765 A | 5/2012 |

(Continued)

OTHER PUBLICATIONS

International Search Report in international application No. PCT/CN2014/083821, dated Nov. 19, 2014, 5 pgs.

(Continued)

*Primary Examiner* — Walli Z Butt
(74) *Attorney, Agent, or Firm* — Cooper Legal Group, LLC

(57) ABSTRACT

Methods, nodes, a system, and computer storage mediums for non-contention random access are provided. The method for non-contention random access includes that: a first node sends configuration information of non-contention random access to a second node through a downlink channel; and the second node obtains the configuration information of the non-contention random access, and sends a random access message on a Physical Random Access Channel (PRACH) according to the configuration information.

25 Claims, 5 Drawing Sheets

(56) References Cited

U.S. PATENT DOCUMENTS

| | | | | |
|---|---|---|---|---|
| 2015/0373740 A1* | 12/2015 | Eriksson | ........... | H04W 74/0833 370/329 |
| 2016/0150570 A1* | 5/2016 | Wang | ................ | H04W 74/0833 370/329 |
| 2016/0165640 A1* | 6/2016 | Yang | ..................... | H04W 74/08 370/336 |
| 2016/0255591 A1* | 9/2016 | Park | ......................... | H04W 4/70 455/522 |
| 2016/0302080 A1 | 10/2016 | Hwang et al. | | |

FOREIGN PATENT DOCUMENTS

| | | | |
|---|---|---|---|
| CN | 102668683 | A | 9/2012 |
| CN | 102724746 | A | 10/2012 |
| CN | 102740493 | A | 10/2012 |
| CN | 102883459 | A | 1/2013 |
| CN | 103313419 | A | 9/2013 |
| EP | 3079431 | A1 | 10/2016 |
| WO | 2009088858 | A1 | 7/2009 |

OTHER PUBLICATIONS

English Translation of the Written Opinion of the International Search Authority in international application No. PCT /CN2014/ 083821, dated Nov. 19, 2014, 11 pgs.

Qualcomm Incorporated: "RACH Channel Design for MTC Coverage Enhancements", Nov. 13, 2013, 3GPP Draft; RI-135296 RACH Channel Design for MTC Coverage Enhancements, 3rd Generation Partnership Project (3GPP), Mobile Competence Centre ; 650, vol. RAN WG1, No. San Francisco, USA; Retrieved from the Internet: URL:http://www.3gpp.org/ftp/Meetings_3GPP_ SYNC/RAN/RANI/Docs/, 6 pgs.

Panasonic: "Offline report on the handling on PRACH for enhanced coverage mode", Nov. 16, 2013, 3GPP TSG RAN WG1 #75 RI-136057, pp. 1-2, XPQ02765868, Retrieved from the Internet: URL:http://www.3gpp.org/ftp/tsg_ran/wgl_rll/TSGRI_75/Docs/.

Huawei et al: "Determining the repetition level during initial random access and non-initial random access", Nov. 13, 2013, 3GPP Draft; RI-135382, 3rd Generation Partnership Project (3GPP), Mobile Competence Centre ; 650, vol. RAN WG1, No. San Francisco, USA; Retrieved from the Internet: URL:http://www.3gpp•org/ ftp/Meetings_3GPP_SVNC/RAN/RANI/Docs/, 4 pgs.

Supplementary European Search Report in European application No. 14878080.2, dated Jan. 31, 2017, 10 pgs.

"Research of Random Access Procedure in Lte System", Jan. 2011, <<Television technology>>, 3 pgs.

"The TD-scdma LTE system covering distance analysis", Feb. 2011, China Academic Journal Electronic Publishing House, 5 pgs.

"PRACH Coverage Enhancement for MTC UE", 3GPP TSG-RAN WG1 Meeting #35; R1-135155; Nov. 2013; V0.2, 3rd Generation Partnership Project (3GPP), Mobile Competence Centre ; 650, Route Des Lucioles ; F-06921 Sophia-Antipolis Cedex, vol. RAN WG1, No. San Francisco, USA; Retrieved from the Internet: URL:http://www.3gpp.org/ftp/Meetings_3GPP_SYNC/RAN/RAN1/ Docs/, 8 pgs.

* cited by examiner

NON-CONTENTION RANDOM ACCESS METHOD, NODE, SYSTEM, AND COMPUTER STORAGE MEDIUM

TECHNICAL FIELD

The present disclosure relates to a communications technology, particularly to methods, nodes, a system, and computer storage mediums for non-contention random access.

BACKGROUND

Machine Type Communication (MTC) User Equipment (UE), also known as a Machine to Machine (M2M) user communication device, is a major application form of the Internet of Things at present, and have been applied massively mainly because of low power consumption and low cost. M2M devices on the market are mainly based on a Global System of Mobile communication (GSM) system. In recent years, more and more mobile operators choose Long Term Evolution (LTE)/LTE-Advanced (LTE-A) as a direction for evolution of future broadband wireless communications systems since the spectral efficiency of LTE and LTE-A improves, and various types of M2M data services based on LTE/LTE-A will also become more attractive. An M2M service may be truly transferred from a GSM system to an LTE system only when an LTE M2M device is manufactured with a lower cost than that of an MTC terminal of the GSM system.

At present, major alternatives for reducing the cost of an MTC UE include: reduction of the number of receiving antennae of the terminal, reduction of baseband processing bandwidths of the terminal, reduction of a peak rate supported by the terminal, and application of a half-duplex mode and so on. However, the reduction of the cost means performance reduction. Since demands for cell coverage of an LTE/LTE-A system cannot be reduced, it is necessary to take some measures so as to satisfy demands for the coverage performance of an existing LTE terminal when the MTC terminal configured at low cost is applied. Besides, the MTC terminal may locate in a basement, a corner of a wall and so on, and may be in a worse scenario than a common LTE UE. It is necessary to improve the performance of some MTC UEs in order to compensate the reduction in coverage due to penetration loss, thus it is necessary to enhance uplink and downlink coverage of some MTC UEs in such a scenario, while the first consideration is how to guarantee the access quality of a user. It is necessary to design an enhanced random access channel (referred to a Physical Random Access Channel (PRACH)) of the LTE/LTE-A system so as to ensure that the MTC UE is able to access the system normally.

An evolved Node B (eNB) in the LTE/LTE-A system may allocate a dedicated random access sequence (also called a PRACH preamble) to a UE in a non-contention random access flow. The UE may send the PRACH preamble on a Physical Resource Block (PRB) allocated by the eNB to the UE, and may improve the transmission power of the PRACH preamble successively until the UE is able to detect, from a Random Access Response (RAR) sent by the eNB, RAR information sent to the UE. The UE receives and decodes the RAR information to obtain uplink time synchronization, and an uplink resource, and sends an Msg3 message on the uplink resource so as to complete the random access flow based on non-contention. The Msg3 message is the first message transmitted on a Physical Uplink Shared Channel (PUSCH) by using a Hybrid Automatic Repeat Request (HARQ) mechanism based on uplink scheduling.

Access of an MTC UE that requires Coverage Improvement (CI) to a system is not necessarily guaranteed even if a PRACH preamble is transmitted at full power, thus the power of the MTC UE with CI can be hardly improved in the non-contention random access flow. Therefore, it is necessary to provide a random access solution based on the CI MTC UE in such a scenario so as to ensure that the CI MTC UE can access the system normally.

SUMMARY

In order to solve existing technical problems, embodiments of the present disclosure provide methods, nodes, a system, and computer storage mediums for non-contention random access, which can effectively enhance the random access performance of a UE that requires CI.

Technical solutions of the embodiments of the present disclosure are implemented by the following manners so as to achieve the purpose above.

An embodiment of the present disclosure provides a method for non-contention random access. The method includes that:

a first node sends configuration information of non-contention random access to a second node through a downlink channel; and the second node obtains the configuration information of the non-contention random access, and sends a random access message on a PRACH according to the configuration information of the non-contention random access.

An embodiment of the present disclosure provides another method for non-contention random access, applied to a first node. The method includes that:

the first node sends configuration information of non-contention random access through a downlink channel.

An embodiment of the present disclosure provides still another method for non-contention random access, applied to a second node. The method includes that:

the second node obtains configuration information of non-contention random access; and sends a random access message on a PRACH according to the configuration information of the non-contention random access.

An embodiment of the present disclosure further provides a node. The node may be a first node and the node includes a signaling sending unit and a configuring unit, wherein the signaling sending unit is configured to send, through a downlink channel, configuration information of non-contention random access; and the configuring unit is configured to configure the configuration information of the non-contention random access.

An embodiment of the present disclosure further provides a node. The node may be a second node and the node includes an obtaining unit and a sending unit, wherein the obtaining unit is configured to obtain configuration information of non-contention random access; and the sending unit is configured to send a random access message on a PRACH according to the configuration information of the non-contention random access.

An embodiment of the present disclosure further provides a system for non-contention random access. The system includes: a first node and a second node;

the first node is configured to send configuration information of non-contention random access to the second node through a downlink channel; and the second node is configured to obtain the configuration information of the non-contention random access sent by the first node and send a random access message on a PRACH according to the configuration information of the non-contention random access.

An embodiment of the present disclosure further provides a computer storage medium. The computer storage medium stores computer executable instructions used for executing the method for non-contention random access applied to the first node according to the embodiment of the present disclosure.

An embodiment of the present disclosure further provides a computer storage medium. The computer storage medium stores computer executable instructions used for executing the method for non-contention random access applied to the second node according to the embodiment of the present disclosure.

According to the technical solutions provided by the embodiments of the present disclosure, a first node sends configuration information of non-contention random access to a second node through a downlink channel, and the second node obtains the configuration information of the non-contention random access and sends a random access message on a PRACH according to the configuration information. In this way, the random access performance of a UE that requires CI is improved effectively and an access time delay is reduced.

DETAILED DESCRIPTION

The present disclosure will be further expounded hereinafter with reference to the accompanying drawings and specific embodiments.

Figure 1:
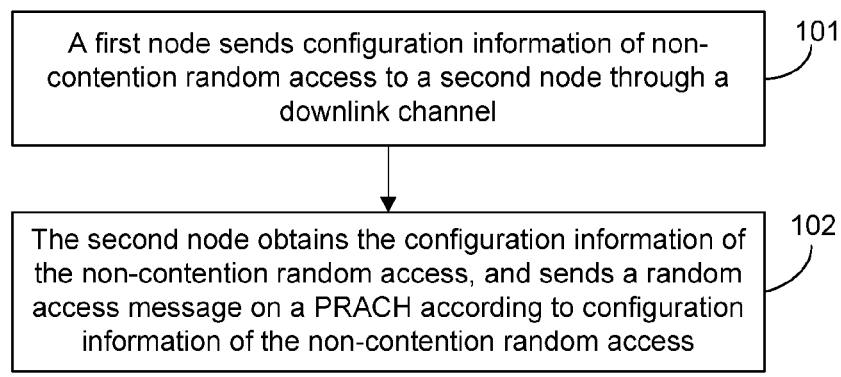
FIG. 1 is a flowchart of a method for non-contention random access according to an embodiment of the present disclosure.

FIG. 1 is a flowchart of a method for non-contention random access according to an embodiment of the present disclosure. As shown in FIG. 1, the method for non-contention random access includes the following steps.

Step 101: A first node sends configuration information of non-contention random access to a second node through a downlink channel.

Here, the configuration information of the non-contention random access includes at least one first level allocated by the first node for the second node, and the at least one first level include at least one of following information:

a level of repeated sending of a random access message;
a level of repeated sending of an RAR;
a level of repeated sending of an Msg3 message; and
a Coverage Improvement Level (CIL) of the second node.

The configuration information of the non-contention random access further includes a PRACH preamble allocated for the second node.

Specifically, the configuration information is system-configured or configured in System Information (SI) or Downlink Control Information (DCI) by the first node, wherein the SI is sent over a Physical Downlink Shared Channel (PDSCH) and the DCI is sent over a Physical Downlink Control Channel (PDCCH) or an Enhanced Physical Downlink Control Channel (EPDCCH), wherein the system configuration in the present embodiment includes several manners as follows: predefinition by standards or a network, configuration by standards, a network or a higher layer of a network, and so on, wherein the first node may be a Macrocell, a Microcell, a Picocell, a Femtocell which is also known as a home base station, a Low Power Node (LPN), a relay, and so on.

Step 102: The second node obtains the configuration information of the non-contention random access, and sends a random access message on a PRACH according to the configuration information.

In the present embodiment, the second node may be at least one terminal or at least one terminal group. Specifically, the terminal may be a MTC terminal and/or a CI MTC terminals.

In the present embodiment, the configuration information of the non-contention random access obtained by the second node includes at least one first level allocated by the first node for the second node, and the at least one first level includes at least one of the following information:

the level of repeated sending of the random access message;
the level of repeated sending of the RAR;
the level of repeated sending of the Msg3 message; and
the CIL of the second node.

The configuration information of the non-contention random access further includes the PRACH preamble allocated for the second node.

In the present embodiment, the CIL of the second node is in a mapping relation with the level of repeated sending of the random access message, and/or the level of repeated sending of the RAR, and/or the level of repeated sending of the Msg3 message.

In the present embodiment, the number of times of repeated sending of the random access message on the PRACH is determined according to a preset rule, and a mapping relation exists between the number of times of repeated sending of the random access message and the level of repeated sending of the random access message. For example, a repetition level 1 corresponds to 4 repetition times, a repetition level 2 corresponds to 10 repetition times and a repetition level 3 corresponds to 20 repetition times, wherein the number of times of repeated sending of the random access message on the PRACH is determined according to the preset rule, including one of the following manners:

the number of times of repeated sending of the random access message on the PRACH is configured as the number of times of repeated sending, which is configured by the second node currently, of the random access message;

the number of times of repeated sending of the random access message is determined according a level of repeated sending of the random access message, wherein the level of repeated sending is configured by the second node currently;

a level of repeated sending of the random access message is determined according to the first level currently configured by the second node, and the number of times of repeated sending of the random access message is determined according to the level of repeated sending of the random access message;

a level of repeated sending of the random access message is determined according to a first level indicated in the configuration information of the non-contention random access allocated for the second node, and the number of times of repeated sending of the random access message is determined according to the level of repeated sending of the random access message;

a level of repeated sending of the random access message is determined according to any first level indicated in the configuration information of the non-contention random access allocated for the second node, and the number of times of repeated sending of the random access message is determined according to the level of repeated sending of the random access message;

a level of repeated sending of the random access message is determined according to the maximum first level indicated in the configuration information of the non-contention random access allocated for the second node, and the number of times of repeated sending of the random access message is determined according to the level of repeated sending of the random access message; and a level of repeated sending of the random access message is determined according to the minimum first level indicated in the configuration information of the non-contention random access allocated for the second node, and the number of times of repeated sending of the random access message is determined according to the level of repeated sending of the random access message, wherein the random access message is generated by the PRACH preamble according to a preset rule.

After Step 102, the first node receives the random access message from the second node, and sends the RAR to the second node. After receiving the RAR sent by the first node, the second node sends the Msg3 message on a time-frequency resource allocated in the RAR, so as to complete the non-contention random access.

Here, a repetition level of the RAR sent by the first node is determined to be:

a repetition level of the random access message from the second node;

or a repetition level of reception of the RAR, wherein the repetition level of reception is configured by the second node currently;

or a repetition level of the RAR, configured in the configuration information;

or the maximum repetition level among repetition levels of reception of the RAR, wherein the repetition levels of reception can be configured by the second node;

or the minimum repetition level among repetition levels of reception of the RAR, wherein the repetition levels of reception can be configured by the second node.

Here, when the RAR is sent for the $n^{th}$ time, n being an integer larger than or equal to 2, a repetition level of the RAR is determined to be:

a repetition level of the RAR sent by the first node for the $(n-1)^{th}$ time;

or a repetition level obtained by summating M and a first node-configured repetition level of the RAR sent for the (n−1)th time, wherein M is an integer larger than or equal to 1;

or a repetition level corresponding to N-fold the number of repeated sending times corresponding to a first node-configured repetition level of the RAR sent for the $(n-1)^{th}$ time, wherein N is an integer larger than or equal to 1;

or a repetition level of the random access message sent by the second node;

or a repetition level of the random access message sent by the second node for the $(n-1)^{th}$ time, wherein a mapping relation exists between a level of repeated sending of the RAR and the number of times of repeated sending of the RAR.

Here, when the RAR is sent for the $n1^{th}$ time, n1 being an integer larger than or equal to 2, the number of times of repeated sending of the RAR is determined to be:

the number of times of repeated sending of the RAR, which corresponds to a first node-configured repetition level of the RAR;

or T times of first node-configured number of repeated sending times of the RAR sent for the $(n1-1)^{th}$ time, wherein T is an integer larger than or equal to 1, wherein an initial resource location and/or a sending time window length which are/is occupied by the RAR and/or a detection time window length are/is at least determined according to a repetition level used by the RAR, i.e. the initial resource location and/or the sending time window length which are/is occupied by the RAR and/or the detection time window length may be determined according to the repetition level used by the RAR, but is not limited to be determined by the method in the embodiment of the present disclosure.

Here, when the second node fails to successfully receive the RAR sent for the $n2^{th}$ time by the first node, n2 being an integer larger than or equal to 2, the second node resends the random access message according to the number of times of repeated sending of the random access message randomly accessed for the $(n2-1)^{th}$ time;

or the second node resends the random access message according to the number of times of repeated sending obtained by summating M1 and the number of times of repeated sending of the random access message randomly accessed for the $(n2-1)^{th}$ time, wherein M1 is an integer larger than or equal to 1;

or the second node resends, according to N1 times of the number of times of repeated sending of the random access message randomly accessed for the $(n2-1)^{th}$ time, wherein N1 is an integer larger than or equal to 1.

Here, when the second node fails to successfully receive the RAR sent for the $n3^{th}$ time by the first node, n3 being an integer larger than or equal to 2, the second node regenerates a random access message, wherein the regenerated random access message is generated according to the following PRACH preambles based on a preset rule:

a PRACH preamble used when the second node sends the random access message for the $(n3-1)^{th}$ time;

or the PRACH preamble in the configuration information;

or a PRACH preamble at least determined by a PRACH preamble used when the second node sends the random access message for the $(n3-1)^{th}$ time, wherein the PRACH preamble at least determined by the PRACH preamble used when the second node sends the random access message for the $(n3-1)^{th}$ time indicates that the random access message may be determined by the PRACH preamble used when the second node sends the random access message for the $(n3-1)^{th}$ time, but is not limited to be determined by the method of the embodiment of the present disclosure.

Here, a repetition level of the Msg3 message is determined to be:

a repetition level used when the second node sends the random access message;

or a repetition level used by the second node to receive the RAR;

or a repetition level of the Msg3 message, configured by the second node currently;

or a repetition level of the Msg3 message, configured in the configuration information;

or the maximum repetition level among repetition levels of the Msg3 message that are capable of being configured by the second node;

or the minimum repetition level among repetition levels of the Msg3 message that are capable of being configured by the second node.

In the present embodiment, the repetition levels of the Msg3 message that are capable of being configured by the second node may include at least one repetition level of the Msg3 message. The maximum repetition level among the repetition levels of the Msg3 message that can be configured by the second node is the maximum repetition level among the at least one repetition level of the Msg3 message, and the minimum repetition level among the repetition levels of the Msg3 message that are capable of being configured by the second node is the minimum repetition level among the at least one repetition level of the Msg3 message.

Here, when the Msg3 message is sent for the $n4^{th}$ time, n4 being an integer larger than or equal to 2, the repetition level of the Msg3 message is determined to be:

a repetition level of the Msg3 message, configured by the second node for the $(n4-1)^{th}$ time;

or a repetition level obtained by summating M2 and a repetition level of the Msg3 message configured by the second node for the $(n4-1)^{th}$ time, wherein M2 is an integer larger than or equal to 1;

or a repetition level corresponding to N2-fold the number of repetition times corresponding to a repetition level of the Msg3 message configured by the second node for the $(n4-1)^{th}$ time, wherein N2 is an integer larger than or equal to 1;

or a repetition level of the random access level sent by the second node;

or a repetition level of the RAR received by the second node, wherein a mapping relation exists between a level of repeated sending of the Msg3 message and the number of times of repeated sending of the Msg3 message.

Here, when the Msg3 message is sent for the $n5^{th}$ time, n5 being an integer larger than or equal to 2, the number of times of repeated sending of the Msg3 message is determined to be:

the number of times of repeated sending of the Msg3 message, which corresponds to a repetition level of the Msg3 message and is configured by the second node;

or N3 times of the number of times of repeated sending of the Msg3 message sent by the second node for the $(n5-1)^{th}$ time, wherein N3 is an integer larger than or equal to 1, wherein an initial resource location and/or sending time window length which are/is occupied by the Msg3 message and/or a detection time window length are/is determined according to a repetition level of the Msg3 message.

In the present embodiment, when the PRACH allocated by the non-contention random access and a PRACH allocated by contention random access occupy the same PRB resource, different PRACH preambles are configured for the non-contention PRACH preamble and a contention PRACH preamble. For example, an eNB configures 64 available PRACH preambles in total, and for contention-based random access, PRACH preamble indexes 0 to 17 are configured as preambles that can be used by CIL0, PRACH preamble indexes 18 to 35 are configured as preambles that can be used by CIL1, and PRACH preamble indexes 36 to 53 are configured as preambles that can be used by CIL2. When a PRB resource occupied by a PRACH allocated by the eNB is as same as the PRB resource allocated by the contention-based random access, PRACH preamble indexes 54 to 63 may be allocated as available preambles for the non-contention-based random access.

In the present embodiment, sending the random access message on the PRACH according to the configuration information includes that: the second node continuously sends the random access message by taking P times as a unit, and terminates sending of the random access message when a first termination condition is met, wherein P is a natural number; or the second node sends the random access message for P times first, and continues sending the random access message until a first termination condition is met, wherein the first termination condition includes at least one of the followings:

the random access message is sent by taking P times as a unit, and is sent continuously for C times of the unit, wherein C is system-configured, and P and C are natural numbers;

the random access message is sent continuously for D times, wherein D is system-configured and a natural number;

the second node successfully detects the RAR sent by the first node, and the RAR includes a PRACH preamble index sent by the second node; and the second node successfully detects the RAR sent by the first node, and the RAR includes the RAR sent by the first node to the second node.

In the present embodiment, the Msg message is an access response message. Specifically, the random access message sent by the second node to the first node is an Msg1 message, the RAR sent by the first node to the second node is an Msg2 message and a response message sent by the second node to the first node after receiving the RAR is the Msg3 message.

Based on the method for non-contention random access as shown in FIG. 1, another embodiment of the present disclosure provides a method for non-contention random access, applied to a first node. The first node may be a Macrocell, a Microcell, a Picocell, a Femtocell which is also known as a home base station, an LPN, a relay and so on. The method for non-contention random access includes that: the first node sends configuration information of non-contention random access through a downlink channel.

Here, the configuration information of the non-contention random access includes at least one first level allocated by the first node for a second node, and the at least one first level includes at least one of the following information:

a level of repeated sending of a random access message;
a level of repeated sending of an RAR;
a level of repeated sending of an Msg3 message; and
a CIL of the second node.

The configuration information of the non-contention random access further includes a PRACH preamble allocated for the second node.

Specifically, the configuration information is system-configured or configured in SI or DCI by the first node, wherein the SI is sent over a PDSCH and the DCI is sent over a PDCCH or an EPDCCH, wherein the system configuration in the present embodiment includes several manners as follows: predefinition by standards or a network; configuration by standards, a network or a higher layer of a network; and so on, In the present embodiment, the signalling instruction information further includes the number of times of repeated sending of the random access message, wherein the number of times of repeated sending is configured for the second node and determined according to a preset rule.

In the present embodiment, when a PRACH allocated by the non-contention random access and a PRACH allocated by contention random access occupy the same PRB resource, different PRACH preambles are configured for the non-contention PRACH preamble and a contention PRACH preamble. For example, an eNB configures 64 available PRACH preambles in total, and for contention-based random access, PRACH preamble indexes 0 to 17 are configured as preambles that can be used by CIL0, PRACH preamble indexes 18 to 35 are configured as preambles that can be used by CIL1, and PRACH preamble indexes 36 to 53 are configured as preambles that can be used by CIL2. When a PRB resource occupied by a PRACH allocated by the eNB is as same as the PRB resource allocated by the contention-based random access, PRACH preamble indexes 54 to 63 may be allocated as available preambles for the non-contention-based random access.

In the present embodiment, after the first node sends the configuration information of the non-contention random access through the downlink channel, the method further includes that: the first node receives the random access message from the second node and sends an RAR to the second node, wherein a repetition level of the RAR is determined to be:
a repetition level of the random access message from the second node;

or a repetition level of reception of the RAR, wherein the repetition level of reception is configured by the second node currently;

or a repetition level of the RAR, configured in the configuration information;

or the maximum repetition level among repetition levels of reception of the RAR, wherein the repetition levels of reception can be configured by the second node;

or the minimum repetition level among repetition levels of reception of the RAR, wherein the repetition levels of reception can be configured by the second node.

Here, when the RAR is sent for the $n^{th}$ time, n being an integer larger than or equal to 2, a repetition level of the RAR is determined to be:
a repetition level of the RAR sent by the first node for the $(n-1)^{th}$ time;

or a repetition level obtained by summating M and a first node-configured repetition level of the RAR sent for the $(n-1)^{th}$ time, wherein M is an integer larger than or equal to 1;

or a repetition level corresponding to N times of the number of repeated sending times corresponding to a first node-configured repetition level of the RAR sent for the $(n-1)^{th}$ time, wherein N is an integer larger than or equal to 1;

or a repetition level of the random access message sent by the second node;

or a repetition level of the random access message sent by the second node for the $(n-1)^{th}$ time, wherein a mapping relation exists between a level of repeated sending of the RAR and the number of times of repeated sending of the RAR, wherein when the RAR is sent for the $n1^{th}$ time, n1 being an integer larger than or equal to 2, the number of repetition times of the RAR is determined to be:
the number of times of repeated sending of the RAR, which corresponds to a first node-configured repetition level of the RAR;

or T times of first node-configured number of repeated sending times of the RAR sent for the $(n1-1)^{th}$ time, wherein T is an integer larger than or equal to 1.

Here, an initial resource location and/or a sending time window length which are/is occupied by the RAR and/or a detection time window length are/is at least determined according to a repetition level used by the RAR, i.e. the initial resource location and/or the sending time window length which are/is occupied by the RAR and/or the detection time window length may be determined according to the repetition level used by the RAR, but is not limited to be determined by the method in the embodiment of the present disclosure.

An embodiment of the present disclosure further provides a computer storage medium. The computer storage medium stores computer executable instructions used for executing the method for non-contention random access applied in the first node according to the embodiment of the present disclosure.

Based on the method for non-contention random access as shown in FIG. 1, another embodiment of the present disclosure further provides a method for non-contention random access, applied to a second node. The second node may be at least one terminal or at least one terminal group. Specifically, the terminal may be a MTC terminal and/or a CI MTC terminal. The method for non-contention random access includes that: the second node obtains configuration information of non-contention random access; and sends, according to the configuration information, a random access message on a PRACH.

In the present embodiment, the configuration information of the non-contention random access obtained by the second node includes at least one first level allocated for the second node, and the at least one first level includes at least one of the following information:
a level of repeated sending of the random access message;
a level of repeated sending of an RAR;
a level of repeated sending of an Msg3 message; and
a CIL of the second node.

The configuration information of the non-contention random access further includes a PRACH preamble allocated for the second node.

In the present embodiment, the CIL of the second node is in a mapping relation with the level of repeated sending of the random access message, and/or the level of repeated sending of the RAR, and/or the level of repeated sending of the Msg3 message.

In the present embodiment, the number of times of repeated sending of the random access message on the PRACH is determined according to a preset rule, and a mapping relation exists between the number of times of repeated sending of the random access message and the level of repeated sending of the random access message. For example, a repetition level 1 corresponds to 4 repetition times, a repetition level 2 corresponds to 10 repetition times and a repetition level 3 corresponds to 20 repetition times, wherein the number of times of repeated sending of the random access message on the PRACH is determined according to the preset rule, including at least one of the following manners:

the number of times of repeated sending of the random access message on the PRACH is configured as second-node-configured number of repeated sending times of the random access message currently;

the number of times of repeated sending of the random access message is determined according a level of repeated sending of the random access message, wherein the level of repeated sending is configured by the second node currently;

a level of repeated sending of the random access message is determined according to a first level currently configured by the second node, and the number of times of repeated sending of the random access message is determined according to the level of repeated sending of the random access message;

a level of repeated sending of the random access message is determined according to a first level indicated in the non-contention random access configuration information allocated for the second node, and the number of times of repeated sending of the random access message is determined according to the level of repeated sending of the random access message;

a level of repeated sending of the random access message is determined according to any first level indicated in the non-contention random access configuration information allocated for the second node, and the number of times of repeated sending of the random access message is determined according to the level of repeated sending of the random access message;

a level of repeated sending of the random access message is determined according to the maximum first level indicated in the non-contention random access configuration information allocated for the second node, and the number of times of repeated sending of the random access message is determined according to the level of repeated sending of the random access message; and a level of repeated sending of the random access message is determined according to the minimum first level indicated in the non-contention random access configuration information allocated for the second node, and the number of times of repeated sending of the random access message is determined according to the level of repeated sending of the random access message, wherein the random access message is generated by the PRACH preamble according to a preset rule.

In the present embodiment, after the second node sends the random access message on the PRACH, the method further includes that: the second node sends, when receiving the RAR, the Msg3 message on a time-frequency resource allocated in the RAR, so as to complete the non-contention random access.

Here, a repetition level of the Msg3 message is determined to be:

a repetition level used when the second node sends the random access message;

or a repetition level used by the second node to receive the RAR;

or a repetition level of the Msg3 message, configured by the second node currently;

or a repetition level of the Msg3 message, configured in the configuration information;

or the maximum repetition level among repetition levels of the Msg3 message that are capable of being configured by the second node;

or the minimum repetition level among repetition levels of the Msg3 message that are capable of being configured by the second node.

In the present embodiment, the repetition levels of the Msg3 message that are capable of being configured by the second node may include at least one repetition level of the Msg3 message. The maximum repetition level among the repetition levels of the Msg3 message that are capable of being configured by the second node is the maximum repetition level among the at least one repetition level of the Msg3 message, and the minimum repetition level among the repetition levels of the Msg3 message that are capable of being configured by the second node is the minimum repetition level among the at least one repetition level of the Msg3 message.

Here, when the Msg3 message is sent for the $n4^{th}$ time, n4 being an integer larger than or equal to 2, the repetition level of the Msg3 message is determined to be:

a repetition level of the Msg3 message, configured by the second node for the $(n4-1)^{th}$ time;

or a repetition level obtained by increasing a repetition level of the Msg3 message configured by the second node for the $(n4-1)^{th}$ time by M2, wherein M2 is an integer larger than or equal to 1;

or a repetition level corresponding to N2-fold the number of repetition times corresponding to a repetition level of the Msg3 message configured by the second node for the $(n4-1)^{th}$ time, wherein N2 is an integer larger than or equal to 1;

or a repetition level of the random access level sent by the second node;

or a repetition level of the RAR received by the second node, wherein a mapping relation exists between a level of repeated sending of the Msg3 message and the number of times of repeated sending of the Msg3 message.

Here, when the Msg3 message is sent for the $n5^{th}$ time, n5 being an integer larger than or equal to 2, the number of times of repeated sending of the Msg3 message is determined to be:

the number of times of repeated sending of the Msg3 message, which corresponds to a repetition level of the Msg3 message and is configured by the second node;

or N3 times of the number of times of repeated sending of the Msg3 message sent by the second node for the $(n5-1)^{th}$ time, wherein N3 is an integer larger than or equal to 1.

Here, an initial resource location and/or sending time window length which are/is occupied by the Msg3 message and/or a detection time window length are/is determined according to a repetition level of the Msg3 message.

Here, when the second node fails to successfully receive the RAR sent for the $n2^{th}$ time by the first node, n2 being an integer larger than or equal to 2, the second node resends the random access message according to the number of times of repeated sending of the random access message randomly accessed for the $(n2-1)^{th}$ time;

or the second node resends the random access message according to the number of times of repeated sending obtained by summating M1 and the number of times of repeated sending of the random access message randomly accessed for the $(n2-1)^{th}$ time, wherein M1 is an integer larger than or equal to 1;

or the second node resends, according to N1 times of the number of times of repeated sending of the random access message randomly accessed for the $(n2-1)^{th}$ time, wherein N1 is an integer larger than or equal to 1.

Here, when the second node fails to successfully receive the RAR sent for the $n3^{th}$ time by the first node, n3 being an integer larger than or equal to 2, the second node regenerates a random access message, wherein the random access message is generated by the following PRACH preambles according to a preset rule:

a PRACH preamble used when the second node sends the random access message for the $(n3-1)^{th}$ time;

or the PRACH preamble in the configuration information;

or a PRACH preamble at least determined by a PRACH preamble used when the second node sends the random access message for the $(n3-1)^{th}$ time, wherein the PRACH preamble at least determined by the PRACH preamble used when the second node sends the random access message for the $(n3-1)^{th}$ time indicates that the random access message may be determined by the PRACH preamble used when the second node sends the random access message for the $(n3-1)^{th}$ time, but is not limited to be determined by the method of the embodiment of the present disclosure.

In the present embodiment, sending the random access message on the PRACH according to the configuration information includes that: the second node continuously sends the random access message by taking P times as a unit until a first termination condition is met, wherein P is a natural number; or the second node sends the random access message for P times first, and continues sending the random access message, and terminates sending of the random access message when a first termination condition is met, wherein the first termination condition includes at least one of the followings:

the random access message is sent by taking P times as a unit, and is sent continuously for C times of the unit, wherein C is system-configured, and P and C are natural numbers;

the random access message is sent continuously for D times, wherein D is system-configured and is a natural number;

the second node successfully detects the RAR sent by the first node, and the RAR includes a PRACH preamble index sent by the second node; and the second node successfully detects the RAR sent by the first node, and the RAR includes the RAR sent by the first node to the second node.

In the present embodiment, the Msg message is an access response message. Specifically, the random access message sent by the second node to the first node is an Msg1 message, the RAR sent by the first node to the second node is an Msg2 message and a response message sent by the second node to the first node after receiving the RAR is the Msg3 message.

An embodiment of the present disclosure further provides a computer storage medium. The computer storage medium stores computer executable instructions used for executing the method for non-contention random access applied to the second node according to the embodiment of the present disclosure.

The embodiments of the present disclosure will be further expounded below by taking specific implementation scenarios as examples.

Embodiment 1

A plurality of MTC UEs exists in an LTE/LTE-A system, and the plurality of MTC UEs are divided into normal MTC UEs and Coverage Improvement MTC UEs (CI MTC UEs). Three CILs are configured in the system, which are CIL0, CIL1, and CIL2 respectively. Table 1 is a CIL configuration table. As shown in Table 1, all the CILs have the same CI Target (CIT) value interval. Value ranges in the present embodiment are between 0 dB and 15 dB and the value interval is 5 dB.

TABLE 1

| CIL | Coverage Improvement Target (CIT) |
| --- | --- |
| 0 | 0 dB < CIT <= 5 dB |
| 1 | 5 dB < CIT <= 10 dB |
| 2 | 10 dB < CIT <= 15 dB |

In the present embodiment, the number of repetition times of a PRACH preamble corresponding to CIL0 is 4, the number of repetition times of a PRACH preamble corresponding to CIL1 is 10, and the number of repetition times of a PRACH preamble corresponding to CIL2 is 50.

PRACHs allocated by an eNB to CIL0, CIL1 and CIL2 occupy the same PRB resource, and the eNB allocates different PRACH preambles to distinguish the CILs for contention-based random access. For example, the eNB configures 64 available PRACH preambles in total, wherein PRACH preamble indexes 0 to 17 are configured as preambles that can be used by CIL0, PRACH preamble indexes 18 to 35 are configured as preambles that can be used by CIL1, and PRACH preamble indexes 36 to 53 are configured as preambles that can be used by CIL2. A PRB resource occupied by a PRACH allocated by the eNB for non-contention random access is the same as the PRB resource allocated for the contention-based random access, and the eNB allocates a PRACH preamble different from that available for the contention-based random access for distinguishing. For example, PRACH preamble indexes 54 to 63 may be allocated as available preambles for the non-contention-based random access.

UE1 is a CI MTC UE, and a CIL is CIL1. In other words, a PRACH preamble is sent by UE1 repeatedly for 10 times.

The eNB instructs, through signaling instruction information, UE1 to initiate a non-contention based random access flow. In the present embodiment, the eNB sends a PDCCH order to instruct UE1 to initiate the non-contention based random access flow. A format of the PDCCH order is configured by the system and sent by a PDCCH, wherein the PDCCH order at least includes: a random access preamble sequence index (a preamble index), and a random access resource allocation information index (a PRACH mask index), wherein the preamble index is used for indicating a preamble available to UE 1 based on non-contention random access. For example, preamble index=0 is configured to indicate a first preamble (i.e. preamble index 54) among PRACH preamble indexes 54 to 63. The first preamble is configured as an available preamble of a current CIL of UE1. For example, the first preamble is configured as CIL1 in the present embodiment. The PRACH mask index is used for indicating resource allocation of a PRACH of UE1 and a configured preamble format. In the present embodiment, PRACH mask index is equal to 9, and occupies subframe 1, subframe 4 and subframe 7 in each frame structure according to a PRACH resource preset by the system, and a configured preamble format is preamble format 0 (the preamble format 0 occupies 1 subframe in length, and a specific form of the preamble format 0 is configured by the system). PRB indexes occupied by a PRACH resource frequency domain of UE1 are notified by the eNB to UE1 by signaling. In the present embodiment, PRB indexes occupied by the PRACH resource frequency domain of UE1 are index 20 to index 25.

Figure 2:
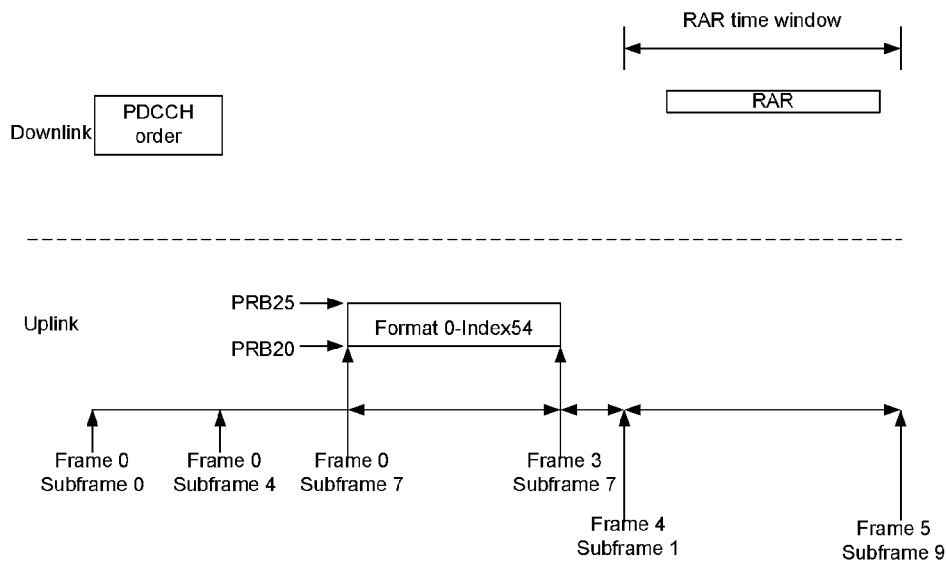
FIG. 2 is a schematic diagram of a first method for non-contention random access according to an embodiment of the present disclosure.

After decoding the PDCCH order successfully, UE1 starts to send a PRACH preamble on a determined subframe. In the present embodiment, it is assumed that sending of the PDCCH order occupies frame 0 subframe 0 to frame 0 subframe 4. UE1 starts sending PRACH preamble index 54 corresponding to CIL1 according to preamble format 0 on subframe index 7, denoted by format 0-index54. FIG. 2 is a schematic diagram of a first method for non-contention random access according to an embodiment of the present disclosure. As shown in FIG. 2, resources of PRB index 20 to index 25 of subframe1, subframe4, and subframe7 from frame 0 subframe 7 to frame 3 subframe 7 are occupied repeatedly by format 0-index54 for 10 times.

After detecting format 0-index54 sent by UE1, the eNB may send an RAR on a downlink channel in a time window, wherein an initial subframe of the time window, the length of the time window and the number of repetition times of the RAR are determined by a CIL of UE1. In the present embodiment, the length of the time window is 20 subframes, and the initial subframe is frame4 subframe 1, then the eNB may send the RAR on the downlink channel in the time window from frame 4 subframe 1 to frame 5 subframe 9. As shown in FIG. 2, after successfully decoding the RAR, UE1 may send an Msg3 message on an uplink resource location indicated in RAR information, wherein the number of times of repeated sending of the Msg3 message is determined by the CIL of UE1.

Embodiment 2

A plurality of MTC UEs exist in an LTE/LTE-A system, and the plurality of MTC UEs are divided into normal MTC UEs and CI MTC UEs. Three CILs are configured in the system, which are CIL0, CIL1, and CIL2 respectively. Table 2 is a CIL configuration table. As shown in Table 2, CIT value intervals corresponding to the CILs are equal. Value ranges in the present embodiment are between 0 dB and 15 dB and the value interval is 5 dB.

TABLE 2

| CIL | Coverage Improvement Target (CIT) |
|---|---|
| 0 | 0 dB < CIT <= 5 dB |
| 1 | 5 dB < CIT <= 10 dB |
| 2 | 10 dB < CIT <= 15 dB |

In the present embodiment, the number of repetition times of a PRACH preamble corresponding to CIL0 is 4, the number of repetition times of a PRACH preamble corresponding to CIL1 is 10, and the number of repetition times of a PRACH preamble corresponding to CIL2 is 50.

PRACHs allocated by an eNB to CIL0, CIL1 and CIL2 occupy the same PRB resource, and the eNB allocates different PRACH preambles to distinguish the CILs for contention-based random access. For example, the eNB configures 64 available PRACH preambles in total, wherein PRACH preamble indexes 0 to 17 are configured as preambles that can be used by CIL0, PRACH preamble indexes 18 to 35 are configured as preambles that can be used by CIL1, and PRACH preamble indexes 36 to 53 are configured as preambles that can be used by CIL2. A PRB resource occupied by a PRACH allocated by the eNB for non-contention random access is the same as the PRB resource allocated for the contention-based random access, and the eNB allocates a PRACH preamble different from that available for the contention-based random access for distinguishing. For example, PRACH preamble indexes 54 to 63 may be allocated as available preambles for the non-contention-based random access.

UE1 is a CI MTC UE, and a CIL is CIL1. In other words, a PRACH preamble is sent by UE1 repeatedly for 10 times.

The eNB instructs, through signaling instruction information, UE1 to initiate a non-contention based random access flow. In the present embodiment, the eNB sends a PDCCH order to instruct UE1 to initiate the non-contention based random access flow. A format of the PDCCH order is configured by the system and sent by a PDCCH, wherein the PDCCH order at least includes: a preamble index, and a PRACH mask index, wherein the preamble index is used for indicating an available preamble for non-contention based random access of UE1. For example, preamble index=3 is configured to indicate a fourth preamble (i.e. preamble index 57) among PRACH preamble indexes 54 to 63. The fourth preamble is configured as a current available preamble of UE1. The PRACH mask index is used for indicating resource allocation of a PRACH of UE 1 and a configured preamble format. In the present embodiment, PRACH mask index is 9, and occupies subframe 1, subframe 4 and subframe 7 in each frame structure according to a PRACH resource preset by the system, and a configured preamble format is preamble format 0 (its length occupies 1 subframe, and a specific form of the preamble format 0 is configured by the system). PRB indexes occupied by a PRACH resource frequency domain of UE1 are notified by the eNB to UE1 by signaling. In the present embodiment, PRB indexes occupied by the PRACH resource frequency domain of UE1 are index 20 to index 25.

Figure 3:
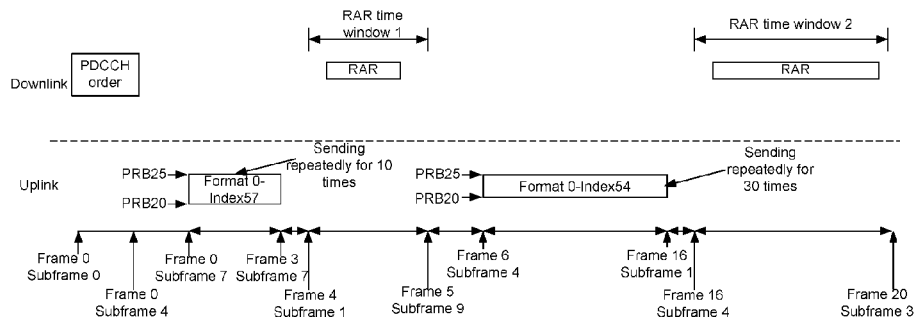
FIG. 3 is a schematic diagram of a second method for non-contention random access according to an embodiment of the present disclosure.

After decoding the PDCCH order successfully, UE1 starts to send a PRACH preamble on a determined subframe. In the present embodiment, it is assumed that sending of the PDCCH order occupies frame 0 subframe 0 to frame 0 subframe 4. UE1 starts sending PRACH preamble index 57 according to preamble format 0 on subframe index 7, denoted by format 0-index57. FIG. 3 is a schematic diagram of a second method for non-contention random access according to an embodiment of the present disclosure. As shown in FIG. 3, the number of times of repeated sending of format 0-index57 is determined by a CIL of UE1. In the present embodiment, the CIL of UE1 is CIL1. In other words, format 0-index57 are sent repeatedly for 10 times, which occupies resources of PRB index 20 to index 25 of subframe1, subframe4, and subframe7 from frame 0 subframe 7 to frame 3 subframe 7.

After failing to detect format 0-index57 sent by UE1, the eNB may not send an RAR on a downlink channel in an RAR time window 1 (from frame 4 subframe 1 to frame 5 subframe 9) configured by the system. As shown in FIG. 3, UE1 also fails to detect, in the RAR time window 1, the RAR sent by the eNB.

UE1 may start resending the PRACH preamble on frame 6 subframe 4. In the present embodiment, the PRACH preamble is resent using preamble format 0. Similarly, PRACH Preamble Index 57 is sent, denoted by format 0-index57. As shown in FIG. 3, the number of repetition times of format 0-index57 is determined by the next level (CIL2) of the currently configured CIL of UE1. The PRACH preamble corresponding to CIL2 is sent repeatedly for 30 times, which occupies resources of PRB index 20 to index 25 of subframe 1, subframe 4, and subframe 7 from frame 6 subframe 4 to frame 16 subframe 1.

After detecting that UE1 chooses to send format 0-index57 repeatedly for 30 times, the eNB may send an RAR on a downlink channel of a time window, wherein an initial subframe of the time window, the length of the time window and the number of repetition times of the RAR are determined by a CIL of UE1 according a mapping relation preset by the system. In the present embodiment, a current CIL of UE1 is CIL2, thus it is further determined that the length of the time window of the RAR is 40 subframes, the initial subframe is a third subframe sent by the PRACH preamble, i.e. frame 16 Subframe4, and the RAR is sent repeatedly for 30 times. Then the eNB will send the RAR on the downlink channel in the time window from frame 16 subframe 4 to frame 20 subframe 3. As shown in FIG. 3, after successfully decoding the RAR, UE1 may send an Msg3 message at an uplink resource location indicated in RAR information, wherein the number of times of repeated sending of the Msg3 message is carried in the RAR.

Besides the present embodiment, a preamble format applied by UE1 to start resending the PRACH preamble on frame subframe 4 may be different from format 0. For example, a format that occupies more subframes in a time domain is applied, such as format 2 (which occupies 2 subframes in the time domain).

Besides the present embodiment, the number of repetition times that UE1 starts resending the PRACH preamble on frame 6 subframe 4 is configured as m times as many as the number of times of repeated sending of the PRACH preamble sent by UE1 last time. For example, UE1 sends the PRACH preamble repeatedly for 10 times last time, and m=2, then the number of repetition times that UE1 starts resending PRACH preamble on frame 6 subframe 4 is configured as 20.

Besides the present embodiment, a preamble applied by UE1 to start resending the PRACH preamble on frame 6 subframe 4 is configured as the next preamble of a PRACH preamble sent by UE1 last time. For example, the PRACH preamble sent by UE1 last time is PRACH preamble index 57, then the PRACH preamble sent this time is PRACH preamble index 58.

Besides the present embodiment, a PRB resource occupied by UE1 to start resending the PRACH preamble on frame 6 subframe 4 may be different from a PRB resource occupied by UE1 to send the PRACH preamble last time.

Embodiment 3

A plurality of MTC UEs exist in an LTE/LTE-A system, and the plurality of MTC UEs are divided into normal MTC UEs and CI MTC UEs. Three PRACH preamble repetition levels are configured in the system, which are PRACH preamble repetition level 0, PRACH preamble repetition level 1, and PRACH preamble repetition level 2 respectively. Table 3 is a CIL configuration table. As shown in Table 3, CIT value intervals corresponding to the PRACH preamble repetition levels are equal. Value ranges in the present embodiment are between 0 dB and 15 dB and the value interval is 5 dB.

TABLE 3

| PRACH Preamble repetition level | Coverage Improvement Target (CIT) |
| --- | --- |
| 0 | 0 dB < CIT <= 5 dB |
| 1 | 5 dB < CIT <= 10 dB |
| 2 | 10 dB < CIT <= 15 dB |

In the present embodiment, the number of repetition times of a PRACH preamble corresponding to PRACH preamble repetition level 0 is 4, the number of repetition times of a PRACH preamble corresponding to PRACH preamble repetition level 1 is 12 and the number of repetition times of a PRACH preamble corresponding to PRACH preamble repetition level 2 is 50.

PRACHs allocated by an eNB to PRACH preamble repetition level 0, PRACH preamble repetition level 1, and PRACH preamble repetition level 2 occupy the same PRB resource, and the eNB allocates different PRACH preambles to distinguish the PRACH preamble repetition levels for contention-based random access. For example, the eNB configures 64 available PRACH preambles in total, wherein PRACH preamble indexes 0 to 17 are configured as preambles that can be used by PRACH preamble repetition level 0, PRACH preamble indexes 18 to 35 are configured as preambles that can be used by PRACH preamble repetition level 1, and PRACH preamble indexes 36 to 53 are configured as preambles that can be used by PRACH preamble repetition level 2. A PRB resource occupied by a PRACH allocated by the eNB for non-contention random access is the same as the PRB resource allocated for the contention-based random access, and the eNB allocates a PRACH preamble different from that available for the contention-based random access for distinguishing. For example, PRACH preamble indexes 54 to 63 may be allocated as available preambles for the non-contention-based random access.

UE1 is a CI MTC UE, and a PRACH preamble repetition level is PRACH preamble repetition level 1. In other words, a PRACH preamble is sent by UE1 repeatedly for 12 times.

The eNB instructs, through signaling instruction information, UE1 to initiate a non-contention based random access flow. In the present embodiment, the eNB sends a PDCCH order to instruct UE1 to initiate the non-contention based random access flow. A format of the PDCCH order is configured by the system and sent by a PDCCH, wherein the PDCCH order at least includes: a preamble index, and a PRACH mask index, wherein the preamble index is used for indicating an available preamble for non-contention based random access of UE1. For example, preamble index=0 is configured to indicate a first preamble (i.e. preamble index 54) among PRACH preamble indexes 54 to 63. The first preamble is configured as a preamble that can be used by the current PRACH preamble repetition level 1 of UE1. The PRACH mask index is used for indicating resource allocation of a PRACH of UE1 and a configured preamble format. In the present embodiment, PRACH mask index is equal to 9, and occupies subframe 1, subframe 4 and subframe 7 in each frame structure according to a PRACH resource preset by the system, and a configured preamble format is preamble format 0 (its length occupies 1 subframe, and a specific form of the preamble format 0 is configured by the system). PRB indexes occupied by a PRACH resource frequency domain of UE1 are notified by the eNB to UE1 by signaling. In the present embodiment, PRB indexes occupied by the PRACH resource frequency domain of UE1 are index 20 to index 25.

Figure 4:
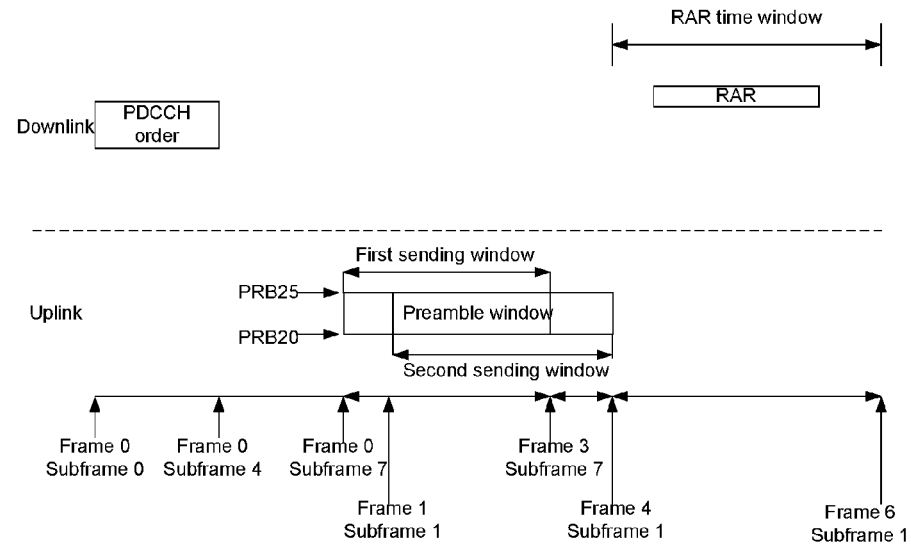
FIG. 4 is a schematic diagram of a third method for non-contention random access according to an embodiment of the present disclosure.

After decoding the PDCCH order successfully, UE1 starts to send a PRACH preamble on a determined subframe. In the present embodiment, it is assumed that sending of the PDCCH order occupies frame 0 subframe 0 to frame 0 subframe 4. UE1 starts sending PRACH preamble index 54 according to preamble format 0 on subframe index 7. FIG. 4 is a flowchart of a third method for non-contention random access according to an embodiment of the present disclosure. As shown in FIG. 4, the number of repetition times of format 0-index54 is configured according to the number of repetition times of the PRACH preamble configured by UE1 last time. In the present embodiment, for example, the number of the PRACH preamble configured by UE1 last time is 10. A preamble window occupies resources of PRB index 20 to index 25 of subframe 1, subframe 4, and subframe 7 from frame 0 subframe 7 to frame 4 subframe 1. There are 2 PRACH preamble sending windows in the preamble window, and the start moments are frame 0 subframe 7 and frame 1 subframe 1 respectively. UE1 selects to start sending format-index 54 repeatedly for 10 times from the start moment frame 0 subframe 7 of the preamble window.

The eNB needs to start detecting the 10 times of repetition of the format-index 54 sent by UE1 at the two start moments. When the eNB detects the format-index 54 sent by UE1 by using frame 0 subframe 7 as the start moment, the eNB may send an RAR on a downlink channel in the time window from frame 4 subframe 1 to frame 6 subframe 1. As shown in FIG. 4, UE 1 needs to detect the RAR sent by the eNB in this RAR time window, and completes a subsequent random access flow according to the content of the detected RAR.

Figure 5:
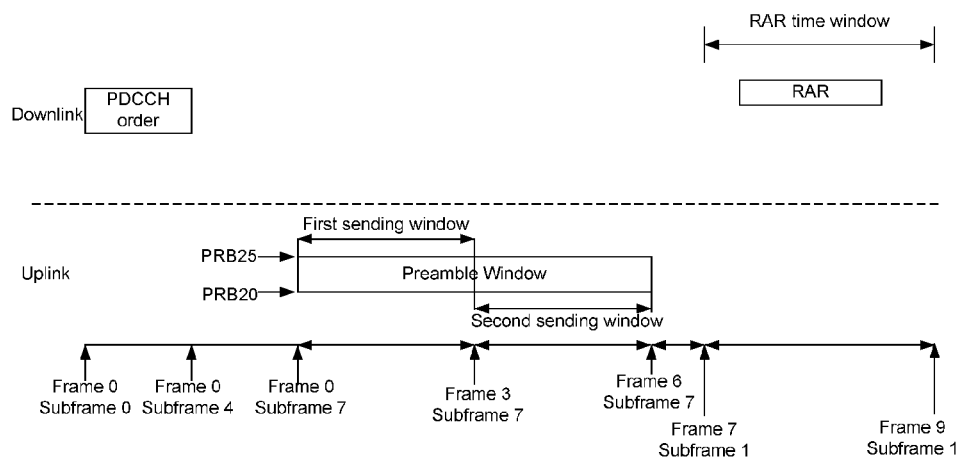
FIG. 5 is a schematic diagram of a fourth method for non-contention random access according to an embodiment of the present disclosure.

Besides the present embodiment, the preamble window may be also configured as shown in FIG. 5. FIG. 5 is a schematic diagram of a fourth method for non-contention random access according to an embodiment of the present disclosure. The preamble window occupies resources of PRB index 20 to index 25 of subframe 1, subframe 4 and subframe 7 from frame 0 subframe 7 to frame 6 subframe 7. There are 2 PRACH preamble sending windows in the preamble window, and the start moments are frame 0 subframe 7 and frame 3 subframe 7 respectively. UE1 selects to start sending format-index 54 repeatedly for 10 times from the start moment frame 3 subframe 7 of the preamble window.

Embodiment 4

A plurality of MTC UEs exist in an LTE/LTE-A system, and the plurality of MTC UEs are divided into normal MTC UEs and CI MTC UEs. Three PRACH preamble repetition levels are configured in the system, which are PRACH preamble repetition level 0, PRACH preamble repetition level 1, and PRACH preamble repetition level 2 respectively. Table 4 is a CIL configuration table. As shown in Table 4, CIT value intervals corresponding to the PRACH preamble repetition levels are equal. Value ranges in the present embodiment are between 0 dB and 15 dB and the value interval is 5 dB.

TABLE 4

| PRACH Preamble repetition level | Coverage Improvement Target (CIT) |
| --- | --- |
| 0 | 0 dB < CIT <= 5 dB |
| 1 | 5 dB < CIT <= 10 dB |
| 2 | 10 dB < CIT <= 15 dB |

In the present embodiment, the number of repetition times of a PRACH preamble corresponding to PRACH preamble repetition level 0 is 4, the number of repetition times of a PRACH preamble corresponding to PRACH preamble repetition level 1 is 10 and the number of repetition times of a PRACH preamble corresponding to PRACH preamble repetition level 2 is 50.

PRACHs allocated by an eNB to PRACH preamble repetition level 0, PRACH preamble repetition level 1, and PRACH preamble repetition level 2 occupy the same PRB resource, and the eNB allocates different PRACH preambles to distinguish the PRACH preamble repetition levels for contention-based random access. For example, the eNB configures 64 available PRACH preambles in total, wherein PRACH preamble indexes 0 to 17 are configured as preambles that can be used by PRACH preamble repetition level 0, PRACH preamble indexes 18 to 35 are configured as preambles that can be used by PRACH preamble repetition level 1, and PRACH preamble indexes 36 to 53 are configured as preambles that can be used by PRACH preamble repetition level 2. A PRB resource occupied by a PRACH allocated by the eNB for non-contention random access is the same as the PRB resource allocated for the contention-based random access, and the eNB allocates a PRACH preamble different from that available for the contention-based random access for distinguishing. For example, PRACH preamble indexes 54 to 63 may be allocated as available preambles for the non-contention-based random access.

UE1 is a CI MTC UE, and a PRACH preamble repetition level is PRACH preamble repetition level 1. In other words, a PRACH preamble is sent by UE1 repeatedly for 10 times.

The eNB instructs, through signaling instruction information, UE1 to initiate a non-contention based random access flow. In the present embodiment, the eNB sends a PDCCH order to instruct UE1 to initiate the non-contention based random access flow. A format of the PDCCH order is configured by the system and sent by a PDCCH, wherein the PDCCH order at least includes: a preamble index, and a PRACH mask index, wherein the preamble index is used for indicating an available preamble for non-contention based random access of UE1. For example, preamble index=0 is configured to indicate a first preamble (i.e. preamble index 54) among PRACH preamble indexes 54 to 63. The first preamble is configured as a preamble that can be used by UE1. The PRACH mask index is used for indicating resource allocation of a PRACH of UE1 and a configured preamble format. In the present embodiment, PRACH mask index is equal to 9, and occupies subframe 1, subframe 4 and subframe 7 in each frame structure according to a PRACH resource preset by the system, and a configured preamble format is preamble format 0 (its length occupies 1 subframe, and a specific form of the preamble format 0 is configured by the system). PRB indexes occupied by a PRACH resource frequency domain of UE1 are notified by the eNB to UE1 by signaling. In the present embodiment, PRB indexes occupied by the PRACH resource frequency domain of UE1 are index 20 to index 25.

Figure 6:
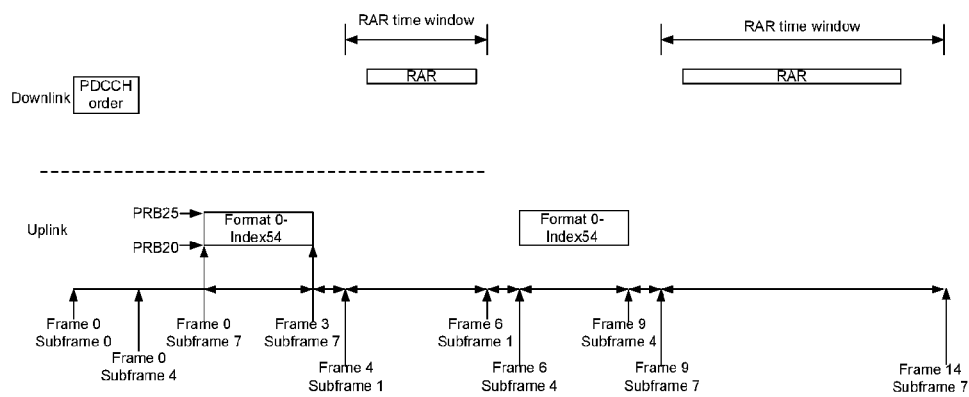
FIG. 6 is a schematic diagram of a fifth method for non-contention random access according to an embodiment of the present disclosure.

After decoding the PDCCH order successfully, UE1 starts to send a PRACH preamble on a determined subframe. In the present embodiment, it is assumed that sending of the PDCCH order occupies frame 0 subframe 0 to frame 0 subframe 4. UE1 starts sending PRACH preamble index 54 according to preamble format 0 on subframe index 7, denoted by format 0-index54. As shown in FIG. 6, 10 times of repetition of format 0-index54 occupies resources of PRB index 20 to index 25 of subframe 1, subframe 4, and subframe 7 from frame 0 subframe 7 to frame 3 subframe 7.

After failing to detect format 0-index54 sent by UE1, the eNB will not send an RAR on a downlink channel in an RAR time window 1 (from frame 4 subframe 1 to frame 6 subframe1) configured by the system. FIG. 6 is a schematic diagram of a fifth method for non-contention random access according to an embodiment of the present disclosure. As shown in FIG. 6, UE1 also fails to detect, in the RAR time window 1, the RAR sent by the eNB.

UE1 will start resending the PRACH preamble on frame 6 subframe 4. In the present embodiment, the PRACH preamble is resent using preamble format 0. Similarly, PRACH Preamble Index 54 is sent, denoted by format 0-index54. As shown in FIG. 6, the number of repetition times of format 0-index54 is the same as the number of repetition times that UE1 sends format 0-index54 last time, and resources of PRB index 20 to index 25 of subframe 1, subframe 4, and subframe 7 from frame 6 subframe 4 to frame 9 subframe 4 are occupied.

When eNB detects that UE1 occupies the resources of PRB index 20 to index 25 of subframe 1, subframe 4, and subframe 7 from frame 6 subframe 4 to frame 9 subframe 4 to send format 0-index54 repeatedly for 10 times, the eNB needs to perform joint detection in combination with the 10 times of repetition of format 0-index54 sent by UE1 on resources of PRB index 20 to index 25 of subframe 1, subframe 4, and subframe 7 from frame 0 subframe 7 to frame 3 subframe 7.

After detecting format 0-index54 sent by UE1, the eNB will send an RAR on a downlink channel of an RAR time window 2 (from frame 9 subframe 7 to frame 14 subframe 7). As shown in FIG. 6, UE1 detects, in the RAR time window 2, the RAR sent by the eNB, and completes a subsequent random access flow according to the content of the detected RAR.

Embodiment 5

A plurality of MTC UEs exist in an LTE/LTE-A system, and the plurality of MTC UEs are divided into normal MTC UEs and CI MTC UEs. Three PRACH preamble repetition levels are configured in the system, which are PRACH preamble repetition level 0, PRACH preamble repetition level 1, and PRACH preamble repetition level 2 respectively. Table 5 is a CIL configuration table. As shown in Table 5, CIT value intervals corresponding to the PRACH preamble repetition levels are equal. Value ranges in the present embodiment are between 0 dB and 15 dB and the value interval is 5 dB.

TABLE 5

| PRACH Preamble repetition level | Coverage Improvement Target (CIT) |
| --- | --- |
| 0 | 0 dB < CIT <= 5 dB |
| 1 | 5 dB < CIT <= 10 dB |
| 2 | 10 dB < CIT <= 15 dB |

In the present embodiment, the number of repetition times of a PRACH preamble corresponding to PRACH preamble repetition level 0 is 4, the number of repetition times of a PRACH preamble corresponding to PRACH preamble repetition level 1 is 10 and the number of repetition times of a PRACH preamble corresponding to PRACH preamble repetition level 2 is 50.

PRACHs allocated by an eNB to PRACH preamble repetition level 0, PRACH preamble repetition level 1, and PRACH preamble repetition level 2 occupy the same PRB resource, and the eNB allocates different PRACH preambles to distinguish the PRACH preamble repetition levels for contention-based random access. For example, the eNB configures 64 available PRACH preambles in total, wherein PRACH preamble indexes 0 to 17 are configured as preambles that can be used by PRACH preamble repetition level 0, PRACH preamble indexes 18 to 35 are configured as preambles that can be used by PRACH preamble repetition level 1, and PRACH preamble indexes 36 to 53 are configured as preambles that can be used by PRACH preamble repetition level 2. A PRB resource occupied by a PRACH allocated by the eNB for non-contention random access is the same as the PRB resource allocated for the contention-based random access, and the eNB allocates a PRACH preamble different from that available for the contention-based random access for distinguishing. For example, PRACH preamble indexes 54 to 63 may be allocated as available preambles for the non-contention-based random access.

UE1 is a CI MTC UE, and a PRACH preamble repetition level is PRACH preamble repetition level 1. In other words, a PRACH preamble is sent by UE1 repeatedly for 10 times.

The eNB instructs, through signaling instruction information, UE1 to initiate a non-contention based random access flow. In the present embodiment, the eNB sends a PDCCH order to instruct UE1 to initiate the non-contention based random access flow. A format of the PDCCH order is configured by the system and sent by a PDCCH, wherein the PDCCH order at least includes: a preamble index, and a PRACH mask index, wherein the preamble index is used for indicating an available preamble for non-contention based random access of UE1. For example, preamble index=0 is configured to indicate a first preamble (i.e. preamble index 54) among PRACH preamble indexes 54 to 63. The first preamble is configured as a preamble that can be used by UE1. The PRACH mask index is used for indicating resource allocation of a PRACH of UE1 and a configured preamble format. In the present embodiment, PRACH mask index is equal to 9, and occupies subframe 1, subframe 4 and subframe 7 in each frame structure according to a PRACH resource preset by the system, and a configured preamble format is preamble format 0 (the length occupies 1 subframe, and a specific form of the preamble format 0 is configured by the system). PRB indexes occupied by a PRACH resource frequency domain of UE1 are notified by the eNB to UE1 by signaling. In the present embodiment, PRB indexes occupied by the PRACH resource frequency domain of UE1 are index 20 to index 25.

Figure 7:
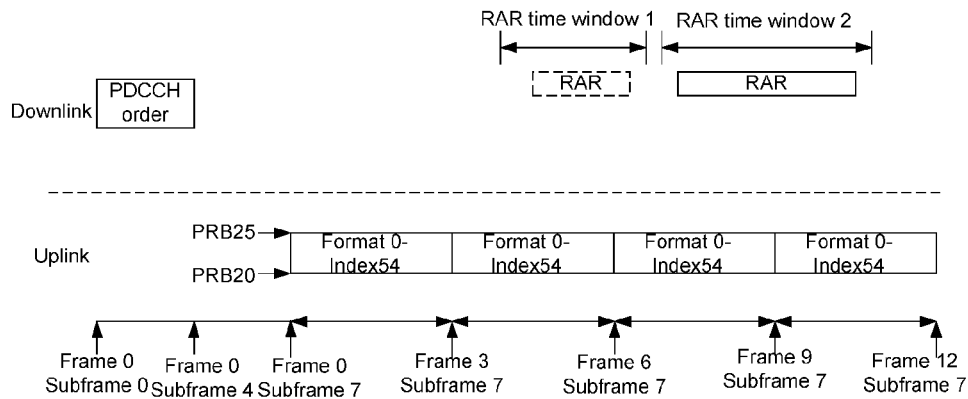
FIG. 7 is a schematic diagram of a sixth method for non-contention random access according to an embodiment of the present disclosure.

After decoding the PDCCH order successfully, UE1 starts to send a PRACH preamble on a determined subframe. In the present embodiment, it is assumed that sending of the PDCCH order occupies frame 0 subframe 0 to frame 0 subframe 4. UE1 starts sending PRACH preamble index 54 according to preamble format 0 on subframe index 7, denoted by format 0-index54. FIG. 7 is a schematic diagram of a sixth method for non-contention random access according to an embodiment of the present disclosure.

As shown in FIG. 7, 10 times of repetition of format 0-index54 occupies resources of PRB index 20 to index 25 of subframe 1, subframe 4, and subframe 7 from frame 0 subframe 7 to frame 3 subframe 7. UE1 will continue the sending by using 10 times of repetition of format 0-index54 as a unit until the following termination condition is satisfied, and then stops the sending.

The termination condition refers to that UE1 successfully detects the RAR sent by the eNB, and the message contains the PRACH preamble index sent by UE1, i.e. PRACH Preamble Index 54.

In the present embodiment, as shown in FIG. 7, UE1 fails to detect, in the RAR window (the RAR window 1) corresponding to the 10 times of repeated sending of format 0-index54, RAR information sent to UE1, and then may continue detection in the RAR window (the RAR window 2) corresponding to 20 times of repeated sending of format 0-index54. In the present embodiment, UE1 successfully detects, in the RAR window 2, the RAR information sent to UE1, stops sending format 0-index54, and completes a subsequent random access flow according to the content of the detected RAR.

Besides the present embodiment, the termination condition may be also one of the followings:

the UE1 performs sending for C times by taking the 10 times of repetition of format 0-index54 as a unit, wherein C is configured by the system; if the condition is met, UE1 believes that the non-contention random access flow fails, and needs to perform a subsequent processing flow according to system configuration, e.g. UE1 initiates a contention-based random access flow;

or UE1 sends format 0-index54 for D times, wherein D is configured by the system; if the condition is met, UE1 believes that the non-contention random access flow fails, and needs to perform a subsequent processing flow according to system configuration, e.g. UE1 initiates a contention-based random access flow;

or UE1 successfully detects the RAR sent by the eNB, and the message contains RAR information sent to UE1; if the condition is met, UE1 stops continued sending of format 0-index54, and completes a subsequent random access flow according to the content of the detected RAR.

Embodiment 6

A plurality of MTC UEs exist in an LTE/LTE-A system, and the plurality of MTC UEs are divided into normal MTC UEs and CI MTC UEs. Four CILs are configured in the system, which are CIL0, CIL1, CIL2 and CIL3, respectively. Table 6 is a CIL configuration table. CIT value intervals corresponding to the CILs are as shown in Table 6.

TABLE 6

| CIL | Coverage Improvement Target (CIT) |
| --- | --- |
| 0 | CIT = 0 dB |
| 1 | 0 dB < CIT <= 5 dB |
| 2 | 5 dB < CIT <= 10 dB |
| 3 | 10 dB < CIT <= 15 dB |

In the present embodiment, the number of repetition times of a PRACH preamble corresponding to CIL0 is 1, the number of repetition times of a PRACH preamble corresponding to CIL1 is 4, the number of repetition times of a PRACH preamble corresponding to CIL2 is 10 and the number of repetition times of a PRACH preamble corresponding to CIL3 is 50.

PRACHs allocated by an eNB to CIL0, CIL1, CIL2 and CIL3 occupy the same PRB resource, and the eNB allocates different PRACH preambles to distinguish the CILs for contention-based random access. For example, the eNB configures 64 available PRACH preambles in total, wherein PRACH preamble indexes 0 to 23 are configured as preambles that can be used by CIL0, PRACH preamble indexes 24 to 33 are configured as preambles that can be used by CIL1, PRACH preamble indexes 34 to 43 are configured as preambles that can be used by CIL2, and PRACH preamble indexes 44 to 53 are configured as preambles that can be used by CIL3. A PRB resource occupied by a PRACH allocated by the eNB for non-contention random access is the same as the PRB resource allocated for the contention-based random access, and the eNB allocates a PRACH preamble different from that available for the contention-based random access for distinguishing. For example, PRACH preamble indexes 54 to 63 may be allocated as available preambles for the non-contention-based random access.

UE1 is a CI MTC UE, and a CIL level is CIL2. In other words, a PRACH preamble is sent by UE1 repeatedly for 10 times.

The eNB instructs, through signaling instruction information, UE1 to initiate a non-contention based random access flow. In the present embodiment, the eNB sends a Radio Resource Control (RRC) signaling to instruct UE1 to initiate the non-contention based random access flow. The RRC signaling includes: a preamble index, and a PRACH mask index, wherein the preamble index is used for indicating an available preamble for non-contention based random access of UE1. For example, preamble index=3 is configured to indicate a fourth preamble (i.e. preamble index 57) among PRACH preamble indexes 54 to 63. The fourth preamble is configured as a current preamble that can be used by UE1. The PRACH mask index is used for indicating resource allocation of a PRACH of UE1 and a configured preamble format. In the present embodiment, PRACH mask index is equal to 9, and occupies subframe 1, subframe 4 and subframe 7 in each frame structure according to a PRACH resource preset by the system, and a configured preamble format is preamble format 0 (its length occupies 1 subframe, and a specific form of the preamble format 0 is configured by the system). PRB indexes occupied by a PRACH resource frequency domain of UE1 are notified by the eNB to UE1 by signaling. In the present embodiment, PRB indexes occupied by the PRACH resource frequency domain of UE1 are index 20 to index 25.

Figure 8:
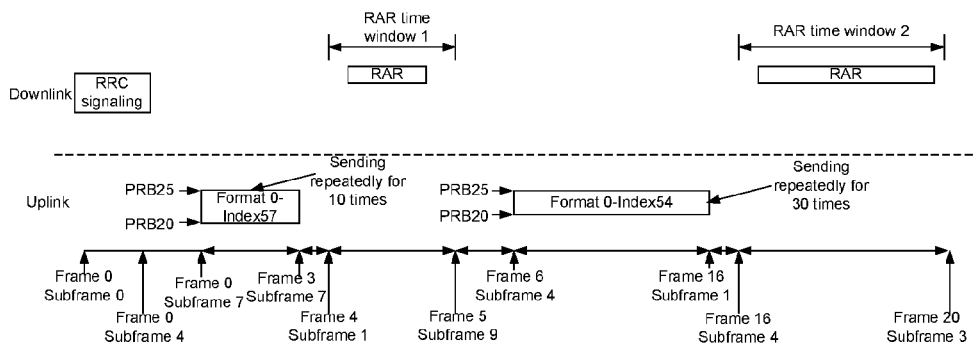
FIG. 8 is a schematic diagram of a seventh method for non-contention random access according to an embodiment of the present disclosure.

After decoding the RRC signaling successfully, UE1 starts to send a PRACH preamble on a determined subframe. In the present embodiment, it is assumed that sending of the RRC signaling occupies frame 0 subframe 0 to frame 0 subframe 4. UE1 starts sending PRACH preamble index 57 according to preamble format 0 on subframe index 7, denoted by format 0-index57. FIG. 8 is a schematic diagram of a seventh method for non-contention random access according to an embodiment of the present disclosure. As shown in FIG. 8, the number of times of repeated sending of format 0-index57 is determined by a CIL of UE1. In the present embodiment, the CIL of UE1 is CIL2. In other words, format 0-index57 is sent repeatedly for 10 times, and resources of PRB index 20 to index 25 of subframe 1, subframe 4, and subframe 7 from frame 0 subframe 7 to frame 3 subframe 7 are occupied.

After failing to detect format 0-index57 sent by UE1, the eNB will not send an RAR on a downlink channel in an RAR time window 1 (from frame 4 subframe 1 to frame 5 subframe 9) configured by the system. As shown in FIG. 8, UE1 either fails to detect, in the RAR time window 1, the RAR sent by the eNB.

UE1 will start resending the PRACH preamble on frame 6 subframe 4. In the present embodiment, the PRACH preamble is resent using preamble format 0. Similarly, PRACH Preamble Index 57 is sent, denoted by format 0-index57. As shown in FIG. 8, the number of repetition times of format 0-index57 is determined by the next level (CIL3) of the currently configured CIL of UE1. A PRACH preamble corresponding to CIL3 is sent repeatedly for 30 times, which occupies resources of PRB index 20 to index 25 of subframe 1, subframe 4, and subframe 7 from frame 6 subframe 4 to frame 16 subframe 1.

After detecting that UE1 chooses to send format 0-index57 repeatedly for 30 times, the eNB will send an RAR on a downlink channel of a time window, wherein an initial subframe of the time window, the length of the time window and the number of repetition times of the RAR are determined by a CIL of UE1 according a mapping relation preset by the system. In the present embodiment, a current CIL of UE1 is CIL3, thus it is further determined that the length of the time window of the RAR is 40 subframes, the initial subframe is a third subframe sent by the PRACH preamble, i.e. frame 16 Subframe 4, and the RAR is sent repeatedly for 30 times. Then the eNB will send the RAR on the downlink channel in the time window from frame 16 subframe 4 to frame 20 subframe 3. As shown in FIG. 8, after successfully decoding the RAR, UE1 will send an Msg3 message on an uplink resource location indicated in RAR information, wherein the number of times of repeated sending of the Msg3 message is carried in the RAR.

Figure 9:
FIG. 9 is a structural diagram of a system for non-contention random access according to an embodiment of the present disclosure.

Based on the method, FIG. 9 is a structural diagram of a system for non-contention random access according to an embodiment of the present disclosure. As shown in FIG. 9, the system for non-contention random access includes: a first node 81 and a second node 82, wherein the first node 81 is configured to send configuration information of non-contention random access to the second node 82 through a downlink channel; and the second node 82 is configured to obtain the configuration information of the non-contention random access sent by the first node 81, and send a random access message on a PRACH according to the configuration information of the non-contention random access.

In the present embodiment, the first node 81 may be a Macrocell, a Microcell, a Picocell, a Femtocell which is also known as a home base station, an LPN, a relay and so on, and the second node 82 may be at least one terminal or at least one terminal group. Specifically, the terminal may be a MTC terminal and/or a MTC CI terminal, wherein the configuration information of the non-contention random access includes at least one first level allocated by the first node 81 for the second node 82, and the first level includes at least one of the following information:

a level of repeated sending of the random access message;
a level of repeated sending of an RAR;
a level of repeated sending of an Msg3 message; and
a CIL of the second node, wherein the configuration information of the non-contention random access further includes a PRACH preamble allocated by the first node 81 for the second node 82, wherein the number of times of repeated sending of the random access message on the PRACH is determined according to a preset rule, wherein a mapping relation exists between the number of times of repeated sending of the random access message and the level of repeated sending of the random access message.

Specifically, the number of times of repeated sending of the random access message on the PRACH is determined according to the preset rule, including one of the following manners:

the number of times of repeated sending of the random access message on the PRACH is configured as the number of repeated sending times, configured by the second node currently, of the random access message;

the number of times of repeated sending of the random access message is determined according a level of repeated sending of the random access message, wherein the level of repeated sending is configured by the second node 82 currently;

a level of repeated sending of the random access message is determined according to a first level currently configured by the second node 82, and the number of times of repeated sending of the random access message is determined according to the level of repeated sending of the random access message;

a level of repeated sending of the random access message is determined according to a first level indicated in the configuration information of the non-contention random access allocated for the second node 82, and the number of times of repeated sending of the random access message is determined according to the level of repeated sending of the random access message;

a level of repeated sending of the random access message is determined according to any first level indicated in the configuration information of the non-contention random access allocated for the second node 82, and the number of times of repeated sending of the random access message is determined according to the level of repeated sending of the random access message;

a level of repeated sending of the random access message is determined according to the maximum first level indicated in the configuration information of the non-contention random access allocated for the second node 82, and the number of times of repeated sending of the random access message is determined according to the level of repeated sending of the random access message; and a level of repeated sending of the random access message is determined according to the minimum first level indicated in the configuration information of the non-contention random access allocated for the second node 82, and the number of times of repeated sending of the random access message is determined according to the level of repeated sending of the random access message.

According to another preferred embodiment of the present disclosure, the first node 81 is further configured to send an RAR to the second node 82 after receiving the random access message from the second node 82.

The second node 82 is further configured to send, after receiving the RAR sent by the first node 81, an Msg3 message on a time-frequency resource allocated in the RAR, so as to complete the non-contention random access process.

Here, a repetition level of the RAR sent by the first node 81 is determined to be:

a repetition level of the random access message from the second node 82;

or a repetition level of reception of the RAR, wherein the repetition level of reception is configured by the second node 82 currently;

or a repetition level of the RAR, configured in the configuration information;

or the maximum repetition level among repetition levels of reception of the RAR, wherein the repetition levels of reception can be configured by the second node 82;

or the minimum repetition level among repetition levels of reception of the RAR, wherein the repetition levels of reception can be configured by the second node 82.

Here, when the RAR is sent for the $n^{th}$ time, n being an integer larger than or equal to 2, a repetition level of the RAR is determined to be:

a repetition level of the RAR sent by the first node 81 for the $(n-1)^{th}$ time;

or a repetition level obtained by summating M and a first node 81-configured repetition level of the RAR sent for the $(n-1)^{th}$ time, wherein M is an integer larger than or equal to 1;

or a repetition level corresponding to N-fold the number of repeated sending times corresponding to a first node

81-configured repetition level of the RAR sent for the $(n-1)^{th}$ time, wherein N is an integer larger than or equal to 1;

or a repetition level of the random access message sent by the second node 82;

or a repetition level of the random access message sent by the second node 82 for the $(n-1)^{th}$ time, wherein a mapping relation exists between a level of repeated sending of the RAR and the number of times of repeated sending of the RAR.

Here, when the RAR is sent for the $n1^{th}$ time, n1 being an integer larger than or equal to 2, the number of times of repeated sending of the RAR is determined to be:

the number of times of repeated sending of the RAR, which corresponds to a first node 81-configured repetition level of the RAR;

or T times of a first node 81-configured number of repeated sending times of the RAR sent for the $(n1-1)^{th}$ time, wherein T is an integer larger than or equal to 1, wherein an initial resource location and/or a sending time window length which are/is occupied by the RAR and/or a detection time window length are/is at least determined according to a repetition level used by the RAR, i.e. the initial resource location and/or the sending time window length which are/is occupied by the RAR and/or the detection time window length may be determined according to the repetition level used by the RAR, but is not limited to be determined by the method in the embodiment of the present disclosure.

Here, when the second node 82 fails to successfully receive the RAR sent for the $n2^{th}$ time by the first node 81, n2 being an integer larger than or equal to 2, the second node 82 resends the random access message according to the number of times of repeated sending of the random access message randomly accessed for the $(n2-1)^{th}$ time;

or the second node 82 resends the random access message according to the number of repeated sending times obtained by summating M1 and the number of times of repeated sending of the random access message randomly accessed for the $(n2-1)^{th}$ time, wherein M1 is an integer larger than or equal to 1;

or the second node 82 resends, according to N1 times of the number of times of repeated sending of the random access message randomly accessed for the $(n2-1)^{th}$ time, wherein N1 is an integer larger than or equal to 1.

Here, when the second node 82 fails to successfully receive the RAR sent for the $n3^{th}$ time by the first node 81, n3 being an integer larger than or equal to 2, the second node 82 regenerates a random access message, wherein the random access message is generated by the following PRACH preambles according to a preset rule:

a PRACH preamble used when the second node 82 sends the random access message for the $(n3-1)^{th}$ time;

or the PRACH preamble in the configuration information;

or a PRACH preamble at least determined by a PRACH preamble used when the second node 82 sends the random access message for the $(n3-1)^{th}$ time, wherein the PRACH preamble at least determined by the PRACH preamble used when the second node sends the random access message for the $(n3-1)^{th}$ time indicates that the random access message may be determined by the PRACH preamble used when the second node sends the random access message for the $(n3-1)^{th}$ time, but is not limited to be determined by the method of the embodiment of the present disclosure.

Here, a repetition level of the Msg3 message is determined to be:

a repetition level used when the second node 82 sends the random access message;

or a repetition level used by the second node 82 to receive the RAR;

or a repetition level of the Msg3 message, configured by the second node 82 currently;

or a repetition level of the Msg3 message, configured in the configuration information;

or the maximum repetition level among repetition levels of the Msg3 message that are capable of being configured by the second node 82;

or the minimum repetition level among repetition levels of the Msg3 message that are capable of being configured by the second node 82.

In the present embodiment, the repetition levels of the Msg3 message that are capable of being configured by the second node 82 may include at least one repetition level of the Msg3 message. The maximum repetition level among the repetition levels of the Msg3 message that are capable of being configured by the second node 82 is the maximum repetition level among the at least one repetition level of the Msg3 message, and the minimum repetition level among the repetition levels of the Msg3 message that are capable of being configured by the second node 82 is the minimum repetition level among the at least one repetition level of the Msg3 message.

Here, when the Msg3 message is sent for the $n4^{th}$ time, n4 being an integer larger than or equal to 2, the repetition level of the Msg3 message is determined to be:

a repetition level of the Msg3 message, configured by the second node 82 for the $(n4-1)^{th}$ time;

or a repetition level obtained by summating M2 and a repetition level of the Msg3 message, configured by the second node 82 for the $(n4-1)^{th}$ time, wherein M2 is an integer larger than or equal to 1;

or a repetition level corresponding to N2-fold the number of repetition times corresponding to a repetition level of the Msg3 message configured by the second node 82 for the $(n4-1)^{th}$ time, wherein N2 is an integer larger than or equal to 1;

or a repetition level of the random access level sent by the second node 82;

or a repetition level of the RAR received by the second node 82, wherein a mapping relation exists between a level of repeated sending of the Msg3 message and the number of times of repeated sending of the Msg3 message.

Here, when the Msg3 message is sent for the $n5^{th}$ time, n5 being an integer larger than or equal to 2, the number of times of repeated sending of the Msg3 message is determined to be:

the number of times of repeated sending of the Msg3 message, which corresponds to a repetition level of the Msg3 message and is configured by the second node 82;

or N3 times of the number of times of repeated sending of the Msg3 message sent by the second node 82 for the $(n5-1)^{th}$ time, wherein N3 is an integer larger than or equal to 1, wherein an initial resource location and/or a sending time window length which are/is occupied by the Msg3 message and/or a detection time window length are/is determined according to a repetition level of the Msg3 message.

In the present embodiment, when the PRACH allocated by the non-contention random access and a PRACH allocated by contention random access occupy the same PRB resource, different PRACH preambles are configured for the non-contention PRACH preamble and a contention PRACH preamble. For example, an eNB configures 64 available PRACH preambles in total, and for contention-based random access, PRACH preamble indexes 0 to 17 are configured as preambles that can be used by CIL0, PRACH preamble indexes 18 to 35 are configured as preambles that can be used by CIL1, and PRACH preamble indexes 36 to 53 are configured as preambles that can be used by CIL2. When a PRB resource occupied by a PRACH allocated by the eNB is the same PRB resource allocated by the contention-based random access, PRACH preamble indexes 54 to 63 may be allocated as available preambles for the non-contention-based random access.

In the present embodiment, sending the random access message on the PRACH according to the configuration information includes that: the second node 82 continuously sends the random access message by taking P times as a unit, and terminates sending of the random access message when a first termination condition is met, wherein P is a natural number; or the second node 82 sends the random access message for P times first, and continues sending the random access message, and terminates sending of the random access message when a first termination condition is met, wherein the first termination condition includes at least one of the followings:

the random access message is sent by taking P times as a unit, and is sent continuously for C times of the unit, wherein C is system-configured, and P and C are natural numbers;

the random access message is sent continuously for D times, wherein D is system-configured and a natural number;

the second node 82 successfully detects the RAR sent by the first node 81, and the RAR includes a PRACH preamble index sent by the second node 82; and the second node 82 successfully detects the RAR sent by the first node 81, and the RAR includes the RAR sent by the first node 81 to the second node 82.

In the present embodiment, the Msg message is an access response message. Specifically, the random access message sent by the second node 82 to the first node 81 is an Msg1 message, the RAR sent by the first node 81 to the second node 82 is an Msg2 message, and a response message sent by the second node 82 to the first node 81 after receiving the RAR is the Msg3 message.

Figure 10:
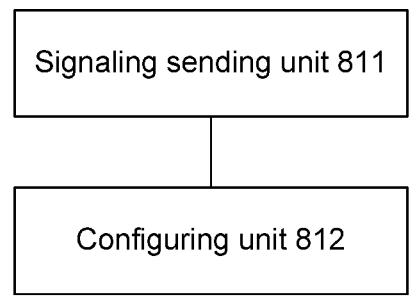
FIG. 10 is a structural diagram of a first node according to an embodiment of the present disclosure.

An embodiment of the present disclosure further provides a node. The node is a first node. FIG. 10 is a structural diagram of a first node according to an embodiment of the present disclosure. As shown in FIG. 10, the first node includes: a configuring unit 812 and a signaling sending unit 811, wherein the configuring unit 812 is configured to configure configuration information of non-contention random access; and the signaling sending unit 811 is configured to send, through a downlink channel, the configuration information of the non-contention random access configured by the configuring unit 812.

Preferably, the configuration information of the non-contention random access configured by the configuring unit 812 includes at least one types of first level allocated for a second node, and the first level includes at least one of the following information:

a level of repeated sending of a random access message;
a level of repeated sending of an RAR;
a level of repeated sending of an Msg3 message; and
a CIL of the second node.

Preferably, the configuration information of the non-contention random access configured by the configuring unit 812 further includes: a PRACH preamble allocated for the second node; and the configuring unit 812 is further configured to, when a PRACH allocated by the non-contention random access and a PRACH allocated by contention random access occupy the same PRB resource, configure different PRACH preambles for the non-contention PRACH preamble and a contention PRACH preamble.

Preferably, the configuring unit 812 is further configured to configure the number of times of repeated sending of the random access message on the PRACH according to a preset rule, wherein a mapping relation exists between the number of times of repeated sending of the random access message and the level of repeated sending of the random access message.

Preferably, the signaling sending unit 811 is further configured to send an RAR after receiving the random access message, wherein a mapping relation exists between a level of repeated sending of the RAR and the number of times of repeated sending of the RAR.

Preferably, the configuring unit 812 is further configured to determine a repetition level of the RAR, and the repetition level of the RAR is specifically determined to be: a repetition level of the random access message from the second node; or a repetition level of reception of the RAR, wherein the repetition level of reception is configured by the second node currently; or a repetition level of the RAR, configured in the configuration information; or the maximum repetition level among repetition levels of reception of the RAR, wherein the repetition levels of reception can be configured by the second node; or the minimum repetition level among repetition levels of reception of the RAR, wherein the repetition levels of reception can be configured by the second node.

Preferably, the configuring unit 812 is further configured to, when the RAR is sent for the $n^{th}$ time, n being an integer larger than or equal to 2, determine a repetition level of the RAR to be: a repetition level of the RAR sent by the first node for the $(n-1)^{th}$ time; or a repetition level obtained by summating M and a first node-configured repetition level of the RAR sent for the $(n-1)^{th}$ time, wherein M is an integer larger than or equal to 1; or a repetition level corresponding to N-fold the number of repeated sending times corresponding to a first node-configured repetition level of the RAR sent for the $(n-1)^{th}$ time, wherein N is an integer larger than or equal to 1; or a repetition level of the random access message sent by the second node; or a repetition level of the random access message sent by the second node for the $(n-1)^{th}$ time.

Preferably, the configuring unit 812 is further configured to, when the RAR is sent for the $n1^{th}$ time, n1 being an integer larger than or equal to 2, determine the number of repetition times of the RAR to be: the number of times of repeated sending of the RAR, which corresponds to a first node-configured repetition level of the RAR; or T times of first node-configured number of repeated sending times of the RAR sent for the $(n1-1)^{th}$ time, wherein T is an integer larger than or equal to 1.

Preferably, the configuring unit 812 is further configured to at least determine an initial resource location and/or a sending time window length which are/is occupied by the RAR and/or a detection time window length according to a repetition level used by the RAR.

Those skilled in the art should understand that, functions of various processing units in the first node according to the embodiment of the present disclosure may be understood with reference to related description of the method for non-contention random access. Various processing units in the first node in the embodiment of the present disclosure may be complemented by an analog circuit executing the functions of the embodiments of the present disclosure, or may be also implemented by operating, on an intelligent terminal, software that executes the functions of the embodiments of the present disclosure, wherein the first node is applied in a base station which may be a Macrocell, a Microcell, a Picocell, a Femtocell also known as a home base station, an LPN, a relay and so on. The configuring unit 812 in the first node may be implemented by a Central Processing Unit (CPU), a Digital Signal Processor (DSP), or a Field-Programmable Gate Array (FPGA) during practical application, and the signaling sending unit 811 in the device may be implemented by a transmitter in the base station during practical application.

Figure 11:
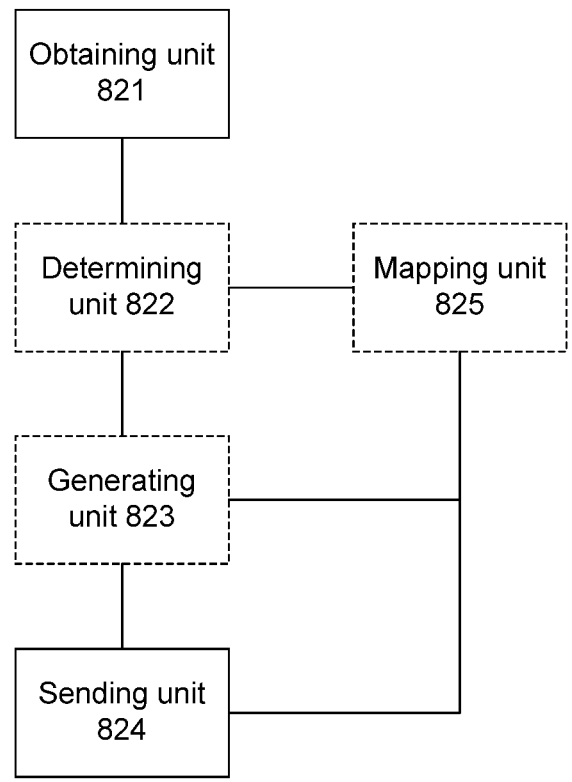
FIG. 11 is a structural diagram of a second node according to an embodiment of the present disclosure.

An embodiment of the present disclosure further provides a node. The node is a second node. FIG. 11 is a structural diagram of a second node according to an embodiment of the present disclosure. As shown in FIG. 11, the second node 82 includes: an obtaining unit 821 and a sending unit 824, wherein the obtaining unit 821 is configured to obtain configuration information of non-contention random access; and the sending unit 824 is configured to send a random access message on a PRACH according to the configuration information of the non-contention random access.

Preferably, the configuration information of the non-contention random access includes at least one first level allocated for the second node, and the first level includes at least one of the following information:

a level of repeated sending of the random access message;

a level of repeated sending of an RAR;

a level of repeated sending of an Msg3 message; and a CIL of the second node.

Preferably, the configuration information of the non-contention random access further includes a PRACH preamble allocated for the second node.

Preferably, the node 82 further includes a mapping unit 825, configured to create and store a mapping relation between the CIL of the second node and the level of repeated sending of the random access message, and/or the level of repeated sending of the RAR, and/or the level of repeated sending of the Msg3 message.

Preferably, the mapping unit 825 is further configured to create and store a mapping relation between the number of times of repeated sending of the random access message and the level of repeated sending of the random access message.

Preferably, the node 82 further includes a determining unit 822, configured to determine the number of times of repeated sending of the random access message on the PRACH according to a preset rule.

Preferably, the determining unit 822 determines the number of the sending times of the random access message according to one of the following manners:

the number of times of repeated sending of the random access message on the PRACH is configured as the number of times of repeated sending of the random access message, wherein the number of times of repeated sending is configured by the second node currently;

the number of times of repeated sending of the random access message is determined according to a level of repeated sending of the random access message, wherein the level of repeated sending is configured by the second node currently;

a level of repeated sending of the random access message is determined according to a first level currently configured by the second node, and the number of times of repeated sending of the random access message is determined according to the level of repeated sending of the random access message;

a level of repeated sending of the random access message is determined according to a first level indicated in the configuration information of the non-contention random access allocated for the second node, and the number of times of repeated sending of the random access message is determined according to the level of repeated sending of the random access message;

a level of repeated sending of the random access message is determined according to any first level indicated in the configuration information of the non-contention random access allocated for the second node, and the number of times of repeated sending of the random access message is determined according to the level of repeated sending of the random access message;

a level of repeated sending of the random access message is determined according to the maximum first level indicated in the configuration information of the non-contention random access allocated for the second node, and the number of times of repeated sending of the random access message is determined according to the level of repeated sending of the random access message; and a level of repeated sending of the random access message is determined according to the minimum first level indicated in the configuration information of the non-contention random access allocated for the second node, and the number of times of repeated sending of the random access message is determined according to the level of repeated sending of the random access message.

Preferably, the node 82 further includes a generating unit 823, configured to generate the random access message according to the PRACH preamble based on a preset rule.

Preferably, the sending unit 824 is further configured to, when failing to successfully receive the RAR sent for the $n2^{th}$ time by the first node, wherein n2 is an integer larger than or equal to 2, resend the random access message according to the number of times of repeated sending of the random access message randomly accessed for the $(n2-1)^{th}$ time; or resend the random access message according to the number of times of repeated sending obtained by summating M1 and the number of times of repeated sending of the random access message randomly accessed for the $(n2-1)^{th}$ time, wherein M1 is an integer larger than or equal to 1; or resend the random access message according to N1 times of the number of times of repeated sending of the random access message randomly accessed for the $(n2-1)^{th}$ time, wherein N1 is an integer larger than or equal to 1.

Preferably, the generating unit 823 is further configured to, when failing to successfully receive the RAR sent for the $n3^{th}$ time by the first node, wherein n3 is an integer larger than or equal to 2, regenerate a random access message, wherein the random access message is generated according to the following PRACH preambles based on a preset rule:

a PRACH preamble used when the random access message is sent for the $(n3-1)^{th}$ time;

or the PRACH preamble in the configuration information;

or a PRACH preamble at least determined by a PRACH preamble used when the second node sends the random access message is sent for the $(n3-1)^{th}$ time.

Preferably, the sending unit 824 is further configured to send, when receiving the RAR, the Msg3 message on a time-frequency resource allocated in the RAR.

Preferably, the determining unit 822 is further configured to determine a repetition level of the Msg3 message to be: a repetition level used when the second node sends the random access message; or a repetition level used by the second node to receive the RAR; or a repetition level of the Msg3 message, configured by the second node currently; or a repetition level of the Msg3 message, configured in the configuration information; or the maximum repetition level among repetition levels of the Msg3 message that are capable of being configured by the second node; or the minimum repetition level among repetition levels of the Msg3 message that are capable of being configured by the second node.

Preferably, the determining unit 822 is further configured to, when the Msg3 message is sent for the $n4^{th}$ time, wherein n4 is an integer larger than or equal to 2, determine the repetition level of the Msg3 message to be: a repetition level of the Msg3 message, configured for the $(n4-1)^{th}$ time; or a repetition level obtained by summating M2 and a repetition level of the Msg3 message configured for the $(n4-1)^{th}$ time, wherein M2 is an integer larger than or equal to 1; or a repetition level corresponding to N2-fold the number of repetition times corresponding to a repetition level of the Msg3 message configured for the $(n4-1)^{th}$ time, wherein N2 is an integer larger than or equal to 1; or a repetition level of the sent random access level sent; or a repetition level of the received RAR.

Preferably, the mapping unit 825 is further configured to create and store a mapping relation between a level of repeated sending of the Msg3 message and the number of times of repeated sending of the Msg3 message.

Preferably, the determining unit 822 is further configured to, when the Msg3 message is sent for the $n5^{th}$ time, wherein n5 is an integer larger than or equal to 2, determine the number of times of repeated sending of the Msg3 message to be: the number of times of repeated sending of the Msg3 message, which corresponds to a configured Msg3 message repetition level; or N3 times of the number of times of repeated sending of the Msg3 message sent for the $(n5-1)^{th}$ time, wherein N3 is an integer larger than or equal to 1.

Preferably, the determining unit 822 is further configured to determine an initial resource location and/or a sending time window length which are/is occupied by the Msg3 message and/or a detection time window length according to a repetition level of the Msg3 message.

Preferably, the sending unit 824 is further configured to continuously send the random access message by taking P times as a unit and terminate sending of the random access message when a first termination condition is met, wherein P is a natural number; or send the random access message for P times first, and continue sending the random access message, and terminate sending of the random access message when a first termination condition is met.

Preferably, the first termination condition includes at least one of the followings:

the random access message is sent by taking P times as a unit, and is sent continuously for C times of the unit, wherein C is system-configured, and P and C are natural numbers;

the random access message is sent continuously for D times, wherein D is system-configured and is a natural number;

the RAR sent by the first node is received successfully, and the RAR comprises a PRACH preamble index sent by the second node; and the RAR sent by the first node is received successfully, and the RAR comprises the RAR sent by the first node to the second node.

Those skilled in the art should understand that, functions of various processing units in the second node according to the embodiment of the present disclosure may be understood with reference to related description of the method for non-contention random access. Various processing units in the second node in the embodiment of the present disclosure may be complemented by an analogue circuit executing the functions of the embodiments of the present disclosure, or may be also implemented by operating, on an intelligent terminal, software that executes the functions of the embodiments of the present disclosure, wherein the second node is applied in a terminal; the terminal may be at least one terminal or at least one terminal group; specifically, the terminal may be a MTC terminal and/or a CI MTC terminal; the determining unit 822, the generating unit 823 and the mapping unit 825 in the second node may be implemented by a CPU, a DSP, or a FPGA during practical application, and the obtaining unit 821 and the sending unit 824 in the second node may be implemented by a transmitter in the base station during practical application.

Those skilled in the art should know that the embodiments of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, an optical memory and the like) including computer-available program codes.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

What are described above are only preferred embodiments of the present disclosure, but are not used for limiting the protection scope of the present disclosure.

INDUSTRIAL APPLICABILITY

A first node in an embodiment of the present disclosure sends configuration information of non-contention random access to a second node through a downlink channel, and the second node obtains the configuration information of the non-contention random access and sends a random access message on a PRACH according to the configuration information. In this way, the random access performance of a UE that requires CI is improved effectively and an access time delay is reduced.

What is claimed is:

1. A method for non-contention random access, comprising:
    sending, by a first node, configuration information of non-contention random access to a second node through a downlink channel; and
    receiving, by the first node, a random access message sent by the second node on a Physical Random Access Channel (PRACH) according to the configuration information of the non-contention random access;
    wherein the random access message is sent by the second node on the PRACH according to the configuration information of the non-contention random access, wherein the random access message is sent by the second node by:
        continuously sending, by the second node, the random access message by taking P times as a unit until a first termination condition is met, wherein P is a natural number; or
        sending, by the second node, the random access message for P times first, and continuing sending the random access message until the first termination condition is met; and
    wherein the first termination condition comprises at least one of:
        the random access message is sent by taking P times as a unit, and is sent continuously for C times of the unit, wherein the C is system-configured, and C is a natural number;
        the random access message is sent continuously for D times, wherein the D is system-configured and a natural number; or
        the second node successfully detects a random access response (RAR) sent by the first node, and the RAR comprises a PRACH preamble index sent by the second node;
    or further comprising:
        sending, by the first node, the RAR after receiving the random access message from the second node;
        wherein a repetition level of the RAR is determined to be:
            a repetition level of the random access message from the second node;
            or a repetition level of reception of the RAR, wherein the repetition level of reception is configured by the second node currently;
            or a repetition level of the RAR, configured in the configuration information of the non-contention random access;
            or a maximum repetition level among repetition levels of reception of the RAR, wherein the repetition levels of reception are capable of being configured by the second node;
            or a minimum repetition level among repetition levels of reception of the RAR, wherein the repetition levels of reception are capable of being configured by the second node.

2. The method according to claim 1, wherein the configuration information of the non-contention random access comprises at least one first level allocated for a second node, and the at least one first level comprises information, wherein the information is at least one of:
    a level of repeated sending of the random access message;
    a level of repeated sending of the RAR;
    a level of repeated sending of a Msg3 message; or
    a Coverage Improvement Level (CIL) of the second node.

3. The method according to claim 2, wherein the configuration information of the non-contention random access further comprises a PRACH preamble allocated for the second node.

4. The method according to claim 3, wherein the first node instructs initiation of the non-contention random access through signaling instruction information, and the signaling instruction information further comprises the number of times of repeated sending of the random access message, wherein the number of times of repeated sending is configured for the second node and is determined according to a preset rule.

5. The method according to claim 1,
    wherein a mapping relation exists between a level of repeated sending of the RAR and the number of times of repeated sending of the RAR;
    or,
    wherein when the RAR is sent for the $n^{th}$ time, the n being an integer larger than or equal to 2, a repetition level of the RAR is determined to be:
        a repetition level of the RAR sent by the first node for the $(n-1)^{th}$ time;
        or a repetition level obtained by summating M and a first node-configured repetition level of the RAR sent for the $(n-1)^{th}$ time, wherein M is an integer larger than or equal to 1;
        or a repetition level corresponding to N-fold the number of times of repeated sending corresponding to a first node-configured repetition level of the RAR sent for the $(n-1)^{th}$ time, wherein N is an integer larger than or equal to 1;
        or a repetition level of the random access message sent by the second node;
        or a repetition level of the random access message sent by the second node last time;
    or,
    wherein when the RAR is sent for the $n1^{th}$ time, the n1 being an integer larger than or equal to 2, the number of repetition times of the RAR is determined to be:
        the number of times of repeated sending of the RAR, which corresponds to a first node-configured repetition level of the RAR;
        or T times of first node-configured number of repeated sending times of the RAR sent for the $(n1-1)^{th}$ time, wherein the T is an integer larger than or equal to 1;
    or,
    wherein an initial resource location and/or a sending time window length which are/is occupied by the RAR and/or a detection time window length are/is at least determined according to a repetition level used by the RAR.

6. A method for non-contention random access, comprising:
obtaining, by a second node, configuration information of non-contention random access; and
sending, by the second node, according to the configuration information of the non-contention random access, a random access message on a Physical Random Access Channel (PRACH);
wherein sending the random access message on the PRACH according to the configuration information of the non-contention random access comprises:
continuously sending, by the second node, the random access message by taking P times as a unit and terminating sending of the random access message when a first termination condition is met, wherein P is a natural number; or
sending, by the second node, the random access message for P times first, and continuing sending the random access message until the first termination condition is met;
wherein the first termination condition comprises at least one of:
the random access message is sent by taking P times as a unit, and is sent continuously for C times of the unit, wherein the C is system-configured, and C is a natural number;
the random access message is sent continuously for D times, wherein the D is system-configured and a natural number; or
the second node successfully detects a random access response (RAR) sent by the first node, and the RAR comprises a PRACH preamble index sent by the second node;
or further comprising:
receiving, by the second node, the RAR sent by the first node;
wherein a repetition level of the RAR is determined to be:
a repetition level of the random access message from the second node;
or a repetition level of reception of the RAR, wherein the repetition level of reception is configured by the second node currently;
or a repetition level of the RAR, configured in the configuration information of the non-contention random access;
or a maximum repetition level among repetition levels of reception of the RAR, wherein the repetition levels of reception are capable of being configured by the second node;
or a minimum repetition level among repetition levels of reception of the RAR, wherein the repetition levels of reception are capable of being configured by the second node.

7. The method according to claim 6, wherein the configuration information of the non-contention random access comprises at least one first level allocated for the second node, and the at least one first level comprises information, wherein the information is at least one of:
a level of repeated sending of the random access message;
a level of repeated sending of the RAR;
a level of repeated sending of a Msg3 message; or
a Coverage Improvement Level (CIL) of the second node.

8. The method according to claim 6, wherein the configuration information of the non-contention random access further comprises a PRACH preamble allocated for the second node, wherein the random access message is generated by the PRACH preamble according to a preset rule.

9. The method according to claim 7, wherein the CIL of the second node is in a mapping relation with the level of repeated sending of the random access message, and/or the level of repeated sending of the RAR, and/or the level of repeated sending of the Msg3 message.

10. The method according to claim 6, wherein the number of times of repeated sending of the random access message on the PRACH is determined according to a preset rule.

11. The method according to claim 10, wherein a mapping relation exists between the number of times of repeated sending of the random access message and a level of repeated sending of the random access message,
wherein the number of times of repeated sending of the random access message on the PRACH is determined according to the preset rule, comprises one of:
configuring the number of times of repeated sending of the random access message on the PRACH as the number of times of repeated sending of the random access message, wherein the number of times of repeated sending is configured by the second node currently;
determining the number of times of repeated sending of the random access message according to the level of repeated sending of the random access message, wherein the level of repeated sending is configured by the second node currently;
determining the level of repeated sending of the random access message according to a first level currently configured by the second node, and determining the number of times of repeated sending of the random access message according to the level of repeated sending of the random access message;
determining the level of repeated sending of the random access message according to a first level indicated in the configuration information of the non-contention random access allocated for the second node, and determining the number of times of repeated sending of the random access message according to the level of repeated sending of the random access message;
determining the level of repeated sending of the random access message according to any first level indicated in the configuration information of the non-contention random access allocated for the second node, and determining the number of times of repeated sending of the random access message according to the level of repeated sending of the random access message;
determining the level of repeated sending of the random access message according to a maximum first level indicated in the configuration information of the non-contention random access allocated for the second node, and determining the number of times of repeated sending of the random access message according to the level of repeated sending of the random access message; or
determining the level of repeated sending of the random access message according to a minimum first level indicated in the configuration information of the non-contention random access allocated for the second node, and determining the number of times of repeated sending of the random access message according to the level of repeated sending of the random access message.

12. The method according to claim 6, further comprising:
when the second node fails to successfully receive the RAR sent for the n2$^{th}$ time by the first node, the n2 being an integer larger than or equal to 2,
resending, by the second node, the random access message according to the number of times of repeated sending of the random access message randomly accessed for the (n2−1)$^{th}$ time;
or resending, by the second node, the random access message according to the number of times of repeated sending obtained by summating M1 and the number of times of repeated sending of the random access message randomly accessed for the (n2−1)$^{th}$ time, wherein the M1 is an integer larger than or equal to 1;
or resending, by the second node, the random access message according to N1-fold the number of times of repeated sending of the random access message randomly accessed for the (n2−1)$^{th}$ time, wherein the N1 is an integer larger than or equal to 1;
or,
the method further comprising:
when the second node fails to successfully receive the RAR sent for the n3$^{th}$ time by the first node, the n3 being an integer larger than or equal to 2, regenerating, by the second node, a random access message which is generated by a PRACH preambles according to a preset rule, wherein the PRACH preamble is:
a PRACH preamble used when the second node sends the random access message for the (n3−1)$^{th}$ time;
or the PRACH preamble in the configuration information;
or a PRACH preamble at least determined by a PRACH preamble used when the second node sends the random access message for the (n3−1)$^{th}$ time.

13. An apparatus, comprising: a processor and a memory for storing instructions executed by the processor, wherein the processor is configured to:
configure configuration information of non-contention random access;
send, through a downlink channel, the configuration information of the non-contention random access; and
receive a random access message sent on a Physical Random Access Channel (PRACH) according to the configuration information of the non-contention random access;
wherein the random access message is sent on the PRACH according to the configuration information of the non-contention random access, wherein the random access message is sent by:
continuously sending the random access message by taking P times as a unit until a first termination condition is met, wherein P is a natural number; or
sending the random access message for P times first, and continuing sending the random access message until the first termination condition is met; and
wherein the first termination condition comprises at least one of:
the random access message is sent by taking P times as a unit, and is sent continuously for C times of the unit, wherein the C is system-configured, and C is a natural number; or
the random access message is sent continuously for D times, wherein the D is system-configured and a natural number;
or the processor is further configured to:
send the RAR after receiving the random access message;
wherein a repetition level of the RAR is determined to be:
a repetition level of the random access message;
or a repetition level of reception of the RAR currently configured;
or a repetition level of the RAR, configured in the configuration information of the non-contention random access;
or a maximum repetition level among repetition levels of reception of the RAR, wherein the repetition levels of reception are capable of being configured;
or a minimum repetition level among repetition levels of reception of the RAR, wherein the repetition levels of reception are capable of being configured.

14. The apparatus according to claim 13, wherein the configuration information of the non-contention random access comprises at least one first level allocated for another apparatus, and the at least one first level comprises information, wherein the information is at least one of:
a level of repeated sending of the random access message;
a level of repeated sending of the RAR;
a level of repeated sending of a Msg3 message; or
a Coverage Improvement Level (CIL) of the another apparatus.

15. The apparatus according to claim 14, wherein the configuration information of the non-contention random access further comprises a PRACH preamble;
the processor is further configured to execute the stored program instructions to, when a PRACH allocated by the non-contention random access and a PRACH allocated by contention random access occupy a same Physical Resource Block (PRB) resource, configure different PRACH preambles for the non-contention PRACH preamble and a contention PRACH preamble.

16. The apparatus according to claim 13, wherein the processor is configured to execute the stored program instructions to configure the number of times of repeated sending of the random access message on the PRACH according to a preset rule, wherein a mapping relation exists between the number of times of repeated sending of the random access message and a level of repeated sending of the random access message.

17. The apparatus according to claim 13, wherein a mapping relation exists between a level of repeated sending of the RAR and the number of times of repeated sending of the RAR.

18. The apparatus according to claim 17, wherein
when the RAR is sent for the nth time, the n being an integer larger than or equal to 2, determine a repetition level of the RAR to be:
a repetition level of the RAR sent for the (n−1)$^{th}$ time; or
a repetition level obtained by summating M and a first configured repetition level of the RAR sent for the (n−1)$^{th}$ time, wherein M is an integer larger than or equal to 1; or
a repetition level corresponding to N-fold the number of times of repeated sending corresponding to a configured repetition level of the RAR sent for the $(n-1)^{th}$ time, wherein N is an integer larger than or equal to 1; or a repetition level of the random access message; or a repetition level of the random access message sent for the $(n-1)^{th}$ time;

or, the processor is further configured to execute the stored program instructions to, when the RAR is sent for the $n1^{th}$ time, the n1 being an integer larger than or equal to 2, determine the number of repetition times of the RAR to be:

the number of times of repeated sending of the RAR, which corresponds to a configured repetition level of the RAR; or T times of configured number of repeated sending times of the RAR sent for the $(n1-1)^{th}$ time, wherein the T is an integer larger than or equal to 1;

or, the processor is further configured to execute the stored program instructions to determine an initial resource location and/or a sending time window length which are/is occupied by the RAR and/or a detection time window length at least according to a repetition level used by the RAR.

19. An apparatus, comprising: a processor and a memory for storing instructions executed by the processor, wherein the processor is configured to:

obtain configuration information of non-contention random access; and send a random access message on a Physical Random Access Channel (PRACH) according to the configuration information of the non-contention random access;

wherein sending the random access message on the PRACH according to the configuration information of the non-contention random access comprises:

continuously sending the random access message by taking P times as a unit and terminating sending of the random access message when a first termination condition is met, wherein P is a natural number; or sending the random access message for P times first, and continuing sending the random access message until the first termination condition is met;

wherein the first termination condition comprises at least one of:

the random access message is sent by taking P times as a unit, and is sent continuously for C times of the unit, wherein the C is system-configured, and C is a natural number;

the random access message is sent continuously for D times, wherein the D is system-configured and a natural number; or the apparatus successfully detects a random access response (RAR), and the RAR comprises a PRACH preamble index;

or the processor is further configured to:

receive the RAR;

wherein a repetition level of the RAR is determined to be:

a repetition level of the random access message;

or a repetition level of reception of the RAR, wherein the repetition level of reception is configured currently;

or a repetition level of the RAR, configured in the configuration information of the non-contention random access;

or a maximum repetition level among repetition levels of reception of the RAR, wherein the repetition levels of reception are capable of being configured;

or a minimum repetition level among repetition levels of reception of the RAR, wherein the repetition levels of reception are capable of being configured.

20. The apparatus according to claim 19, wherein the configuration information of the non-contention random access comprises at least one first level allocated for the apparatus, and the at least one first level comprises information, wherein the information is at least one of:

a level of repeated sending of the random access message;

a level of repeated sending of the RAR;

a level of repeated sending of a Msg3 message; or a Coverage Improvement Level (CIL).

21. The apparatus according to claim 20, wherein the configuration information of the non-contention random access further comprises a PRACH preamble; and the processor is further configured to execute the stored program instructions to generate the random access message according to the PRACH preamble based on a preset rule, and when failing to successfully receive the RAR sent for the n3th time by the apparatus, wherein the $n3^{th}$ is an integer larger than or equal to 2, regenerate a random access message which is generated by a PRACH preamble according to the preset rule, wherein the PRACH preamble is:

a PRACH preamble used when the random access message is sent for the $(n3-1)^{th}$ time;

or the PRACH preamble in the configuration information;

or a PRACH preamble at least determined by a PRACH preamble used when the random access message is sent for the $(n3-1)^{th}$ time.

22. The apparatus according to claim 20, the processor is further configured to execute the stored program instructions to: create and store a mapping relation between the CIL and the level of repeated sending of the random access message, and/or the level of repeated sending of the RAR, and/or the level of repeated sending of the Msg3 message, and create and store a mapping relation between the number of times of repeated sending of the random access message and the level of repeated sending of the random access message; and determine the number of times of repeated sending of the random access message on the PRACH according to a preset rule, wherein the processor is further configured to execute the stored program instructions to determine the number of sending times of the random access message by one of:

configuring the number of times of repeated sending of the random access message on the PRACH as the number of times of repeated sending of the random access message, wherein the number of times of repeated sending is configured currently;

determining the number of times of repeated sending of the random access message according to the level of repeated sending of the random access message, wherein the level of repeated sending is configured currently;

determining the level of repeated sending of the random access message according to a first level currently configured, and determining the number of times of repeated sending of the random access message according to the level of repeated sending of the random access message;

determining the level of repeated sending of the random access message according to a first level indicated in the configuration information of the non-contention random access, and determining the number of times of repeated sending of the random access message according to the level of repeated sending of the random access message;

determining the level of repeated sending of the random access message according to any first level indicated in the configuration information of the non-contention random access, and determining the number of times of repeated sending of the random access message according to the level of repeated sending of the random access message;

determining the level of repeated sending of the random access message according to a maximum first level indicated in the configuration information of the non-contention random access, and determining the number of times of repeated sending of the random access message according to the level of repeated sending of the random access message; or determining the level of repeated sending of the random access message according to a minimum first level indicated in the configuration information of the non-contention random access, and determining the number of times of repeated sending of the random access message according to the level of repeated sending of the random access message.

23. The apparatus according to claim 19, wherein the processor is further configured to execute the stored program instructions to, when failing to successfully receive the RAR sent for the $n2^{th}$ time by the apparatus, wherein the n2 is an integer larger than or equal to 2, resend the random access message according to the number of times of repeated sending of the random access message randomly accessed for the $(n2-1)^{th}$ time; or resend the random access message according to the number of times of repeated sending obtained by summating M1 and the number of times of repeated sending of the random access message randomly accessed for the $(n2-1)^{th}$ time, wherein the M1 is an integer larger than or equal to 1; or resend the random access message according to N1-fold the number of times of repeated sending of the random access message randomly accessed for the $(n2-1)^{th}$ time, wherein the N1 is an integer larger than or equal to 1.

24. A computer storage medium having stored therein computer executable instructions for executing the method for non-contention random access according to claim 1.

25. A computer storage medium having stored therein computer executable instructions for executing the method for non-contention random access according to claim 6.

* * * * *